United States Patent
Ricart et al.

(10) Patent No.: US 11,613,220 B2
(45) Date of Patent: Mar. 28, 2023

(54) ELECTRICAL ASSEMBLY

(71) Applicant: Lear Corporation, Southfield, MI (US)

(72) Inventors: Raúl Ricart, Valls (ES); Antoni Ferré Fàbregas, Valls (ES)

(73) Assignee: Lear Corporation, Southfield, MI (US)

( * ) Notice: Subject to any disclaimer, the term of this patent is extended or adjusted under 35 U.S.C. 154(b) by 661 days.

(21) Appl. No.: 16/405,475

(22) Filed: May 7, 2019

(65) Prior Publication Data

US 2020/0189504 A1    Jun. 18, 2020

Related U.S. Application Data

(63) Continuation-in-part of application No. 16/222,071, filed on Dec. 17, 2018, now Pat. No. 11,117,538.

(51) Int. Cl.
  B60R 21/01    (2006.01)
  B60R 16/023    (2006.01)
        (Continued)

(52) U.S. Cl.
  CPC ............ B60R 21/01 (2013.01); B60R 16/023 (2013.01); B60N 2/005 (2013.01); B60R 21/264 (2013.01); B60R 2021/01286 (2013.01)

(58) Field of Classification Search
  CPC ...... B60N 2/005; B60N 2/072; B60N 2/0722; B60N 2/90; B60R 21/01; B60R 16/023;
        (Continued)

(56) References Cited

U.S. PATENT DOCUMENTS 2,126,143 A    8/1938    McGregor
2,263,554 A    11/1941    Brach
            (Continued)

FOREIGN PATENT DOCUMENTS

CN    203190203 U    9/2013
CN    203358395 U    12/2013
        (Continued)

OTHER PUBLICATIONS

Co-Pending U.S. Appl. No. 16/597,187, filed Oct. 9, 2019.
            (Continued)

*Primary Examiner* — Geepy Pe
*Assistant Examiner* — Sean Patrick Reidy
(74) *Attorney, Agent, or Firm* — Fishman Stewart PLLC

(57) ABSTRACT

An electrical assembly includes a support assembly and/or a track assembly. The support assembly may include a first controller and/or a plurality of safety devices. The electrical assembly may include a track assembly and/or a second controller. The first controller and/or the second controller may be configured to control the plurality of safety devices via a conductor of the track assembly. The plurality of safety devices may include a first safety device, a second safety device, and/or a third safety device. The first safety device may include an airbag and/or may be configured to be activated by pyrotechnics. The first safety device may be configured to be activated by a first deployment current pulse. The support assembly may include a first portion that may include a first contact. The track assembly may include a first track that may include the conductor.

20 Claims, 16 Drawing Sheets

(51) Int. Cl.
*B60N 2/005* (2006.01)
*B60R 21/264* (2006.01)

(58) Field of Classification Search
CPC ........ B60R 21/264; B60R 2021/01286; B60R 21/01554; B60R 16/027
USPC .......................................................... 701/45
See application file for complete search history.

(56) References Cited

U.S. PATENT DOCUMENTS

| | | |
|---|---|---|
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,603,918 A | 9/1971 | Woertz |
| 3,860,904 A | 1/1975 | Andersen |
| 3,933,403 A | 1/1976 | Rubesamen et al. |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,192,045 A | 3/1993 | Kamada et al. |
| 5,222,814 A | 6/1993 | Boelryk |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,848,661 A | 12/1998 | Fu |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,008,547 A | 12/1999 | Dobler et al. |
| 6,036,157 A | 3/2000 | Baroin et al. |
| 6,081,044 A | 6/2000 | Anthofer et al. |
| 6,115,659 A * | 9/2000 | Buchheim ........... B60R 21/0132 180/282 |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,443,574 B1 | 9/2002 | Howell et al. |
| 6,480,144 B1 | 11/2002 | Miller et al. |
| 6,565,119 B2 | 5/2003 | Fogle, Jr. |
| 6,566,765 B1 | 5/2003 | Nitschke et al. |
| 6,643,574 B1 * | 11/2003 | Swart ............... H04L 12/40006 701/45 |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,910,971 B1 * | 12/2014 | Faruque ............... B60R 21/01 280/728.2 |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |

(56) References Cited

U.S. PATENT DOCUMENTS

| | | |
|---|---|---|
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,391,960 B2 | 8/2019 | Settles et al. |
| 10,479,227 B2 | 11/2019 | Nolte et al. |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0236899 A1 | 10/2005 | Kazmierczak |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2006/0284839 A1 | 12/2006 | Breed et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2010/0123302 A1 | 5/2010 | Bujak et al. |
| 2011/0024595 A1 | 2/2011 | Di et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0253146 A1 | 9/2017 | Cooley |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0099655 A1 | 4/2018 | Park et al. |
| 2018/0105072 A1 | 4/2018 | Pons |
| 2018/0126682 A1 | 5/2018 | Fiessler et al. |
| 2018/0148011 A1 | 5/2018 | Zaugg et al. |
| 2018/0183623 A1 | 6/2018 | Schoenfeld et al. |
| 2018/0272977 A1 | 9/2018 | Szawarski et al. |
| 2018/0275648 A1 | 9/2018 | Ramalingam |
| 2018/0281625 A1 | 10/2018 | Akaba et al. |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389331 A1 | 12/2019 | Schukalski et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0139913 A1 | 5/2020 | Wendelrup |
| 2020/0180516 A1 | 6/2020 | Moulin |
| 2020/0180517 A1 | 6/2020 | Moulin |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |
| 2020/0398776 A1 | 12/2020 | Tippy et al. |
| 2021/0315023 A1 | 10/2021 | Tesanovic et al. |
| 2021/0323446 A1 | 10/2021 | Christensen et al. |

FOREIGN PATENT DOCUMENTS

| | | |
|---|---|---|
| CN | 203799201 U | 8/2014 |
| CN | 108141028 A | 6/2018 |
| CN | 108502192 A | 9/2018 |
| DE | 3710476 A1 | 10/1987 |
| DE | 29712180 U1 | 9/1997 |
| DE | 101 03 280 A1 | 8/2002 |
| DE | 101 64 068 A1 | 4/2003 |
| DE | 102 58 837 B3 | 4/2004 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| DE | 102016224512 A1 | 6/2018 |
| DE | 102018106687 A1 | 9/2018 |
| EP | 3565973 A1 | 10/1993 |
| EP | 3783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| ES | 2216311 T3 | 10/2004 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |

(56) References Cited

FOREIGN PATENT DOCUMENTS

| | | | |
|---|---|---|---|
| JP | 2007112174 | A | 5/2007 |
| JP | 2008158578 | A | 7/2008 |
| JP | 4222262 | B2 | 2/2009 |
| JP | 2013230721 | A | 11/2013 |
| KR | 20020042370 | A | 6/2002 |
| WO | 01/87665 | A1 | 11/2001 |
| WO | 2003002256 | A2 | 1/2003 |
| WO | 2004098943 | A1 | 11/2004 |
| WO | 2005068247 | A2 | 7/2005 |

OTHER PUBLICATIONS

Co-Pending U.S. Appl. No. 16/672,989, filed Nov. 4, 2019.
Co-Pending U.S. Appl. No. 16/711,661, filed Dec. 12, 2019.
Chinese Office Action dated Nov. 9, 2021 for Chinese Patent Application 201911127659.2.
Chinese Office Action dated Jan. 6, 2022 related to corresponding Chinese Patent Application No. 201911303962.3.
Chinese Office Action dated Jul. 22, 2022 related to corresponding Chinese Patent Application No. 201911303962.3.

\* cited by examiner

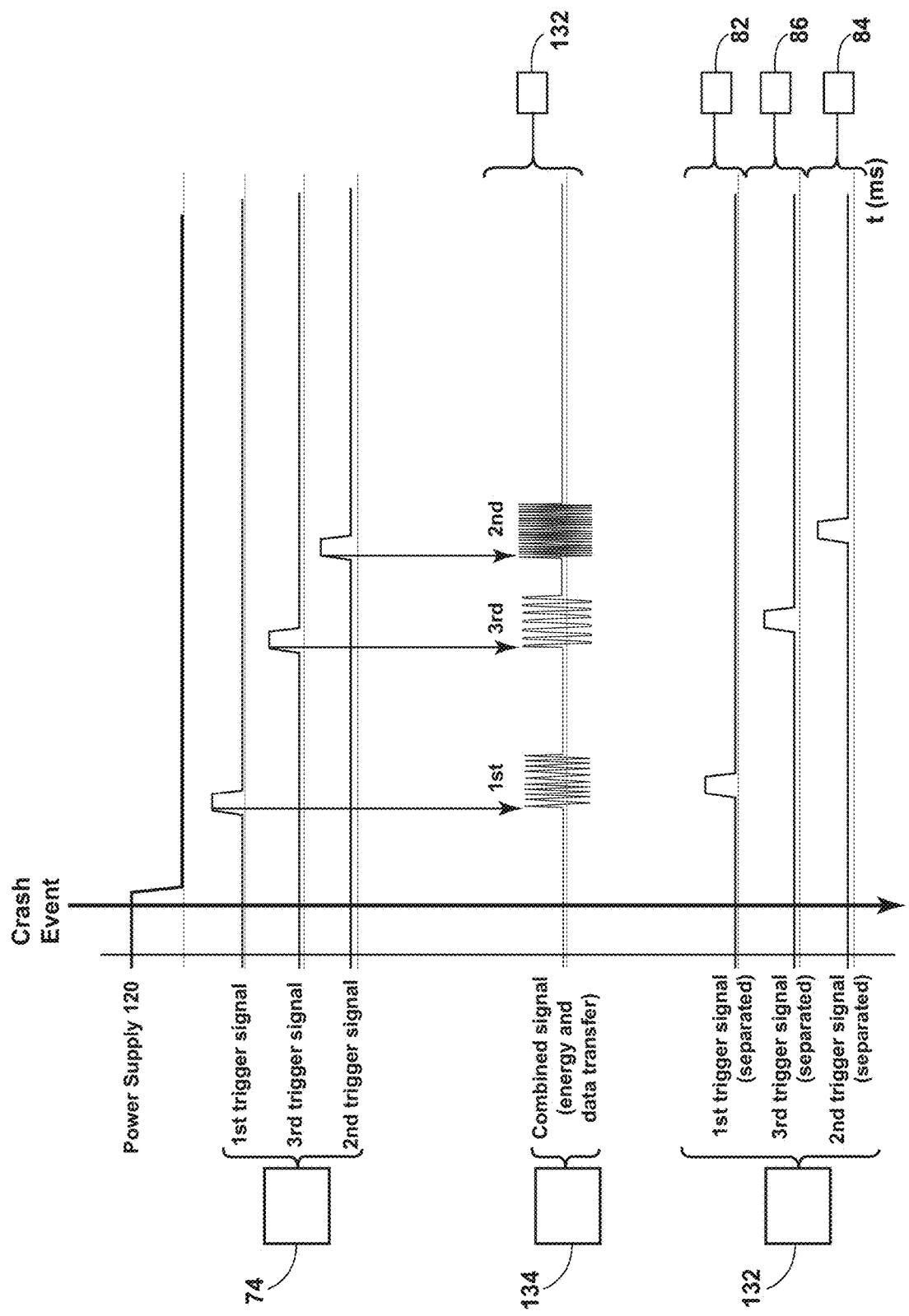

ELECTRICAL ASSEMBLY

CROSS-REFERENCE TO RELATED APPLICATION

This application is a continuation-in-part of U.S. patent application Ser. No. 16/222,071 filed Dec. 17, 2018, the disclosure of which is hereby incorporated by reference in its entirety as though fully set forth herein.

TECHNICAL FIELD

The present disclosure generally relates to electrical assemblies, including electrical assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex and/or may not provide sufficient functionality. Some electrical assemblies may not be configured for use with vehicle seats or removable or reconfigurable seats, such as vehicle seats that include airbags.

There is a desire for solutions/options that minimize or eliminate one or more challenges or shortcomings of electrical assemblies. The foregoing discussion is intended only to illustrate examples of the present field and should not be taken as a disavowal of scope.

SUMMARY

In embodiments, an electrical assembly may include a support assembly and/or a track assembly. The support assembly may include a first controller and/or a plurality of safety devices. The electrical assembly may include a track assembly and/or a second controller. The first controller and/or the second controller may be configured to control the plurality of safety devices via a conductor of the track assembly. Said control may include transferring trigger signals from a third controller to the plurality of safety devices. The plurality of safety devices may include a first safety device, a second safety device, and/or a third safety device. The first safety device may include an airbag and/or may be configured to be activated by pyrotechnics. The first safety device may be configured to be activated by a first deployment current pulse. The support assembly may include a first portion that may include a first contact. The track assembly may include a first track that may include the conductor. The first contact may be configured to contact the conductor when the support assembly may be connected to the track in a first direction. A second track of the track assembly may include an additional conductor. The first contact may be configured to electrically connect with the additional conductor when the support assembly may be connected to the track assembly in a second direction.

With embodiments, the first controller may include a first router and/or the second controller may include a second router. The second router may include a trigger integrator, and/or the first router may include a trigger distributor. The electrical assembly may include a third controller that may be configured to generate a first trigger signal for a first safety device of the plurality of safety devices. The third controller may be configured to generate a second trigger signal for a second safety device of the plurality of safety devices, and/or a third trigger signal for a third safety device of the plurality of safety devices. The first trigger signal, the second trigger signal, and/or the third trigger signal may include deployment current pulses. The second router may be configured to combine the first trigger signal, the second trigger signal, and/or the third trigger signal into a combined signal. The second router may be configured to transmit the combined signal to the first router via the conductor of the track assembly.

In embodiments, the first router may be configured to transmit the first trigger signal to the first safety device, the second trigger signal to the second safety device, and/or the third trigger signal to the third safety device. The first router may be configured to separate the combined signal into the first trigger signal, the second trigger signal, and/or the third trigger signal. The first router may be configured to separate the combined signal according to information from the second router. The first controller may include a first communication device, and/or the second controller may include a second communication device. The second router may be configured to provide the information to the first router via the second communication device and/or the first communication device. An electrical assembly may include a second support assembly connected to the track assembly. The second support assembly may include a second first controller and/or a second plurality of safety devices. The second first controller and the second controller may be configured to control the second plurality of safety devices via a second conductor of the track assembly.

With embodiments, a vehicle may include a track assembly and/or a support assembly. The support assembly may be connected to the track assembly. The support assembly may include a first controller, a seat, and/or a plurality of safety devices that may be connected to the seat. The plurality of safety devices may include a first safety device, a second safety device, and/or a third safety device. The vehicle may include a second controller that may be connected to the track assembly and/or a third controller that may be connected to the second controller. The second controller may be configured to generate a first trigger signal for the first safety device, a second trigger signal for the second safety device, and/or a third trigger signal for the third safety device. The second controller may be configured to transmit the first trigger signal, the second trigger signal, and/or the third trigger signal to the first controller via a single conductor of the track assembly. The support assembly may include a first router, and/or the second controller may include a second router. The second router may be configured to combine the first trigger signal, the second trigger signal, and/or the third trigger signal into a combined trigger signal. A sequence of the combined trigger signal may correspond to an orientation of the seat.

In embodiments, the first router may be configured to separate the first trigger signal, the second trigger signal, and/or the third trigger signal from the combined trigger signal that may be received from the second router. The first router may be configured to provide the first trigger signal to the first safety device, provide the second trigger signal to the second safety device, and/or provide the third trigger signal to the third safety device. The first router may be configured to separate the first trigger signal, the second trigger signal, and/or the third trigger signal according to information from the second controller. The support assembly may include a first sensor, a second sensor, and/or a third sensor. The second controller may include a first sensor mirror, a second sensor mirror, and/or a third sensor mirror. The first sensor may be configured to communicate with the first sensor mirror, the second sensor may be configured to communicate with the second sensor mirror, and/or the third sensor may be configured to communicate with the third sensor mirror. The first sensor may be configured to obtain information about a status of the first safety device, the second sensor may be configured to obtain information about a status of the second safety device, and/or the third sensor may be configured to obtain information about a status of the third safety device.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 7B is a graphical representation of trigger signals of an embodiment of an electrical assembly according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
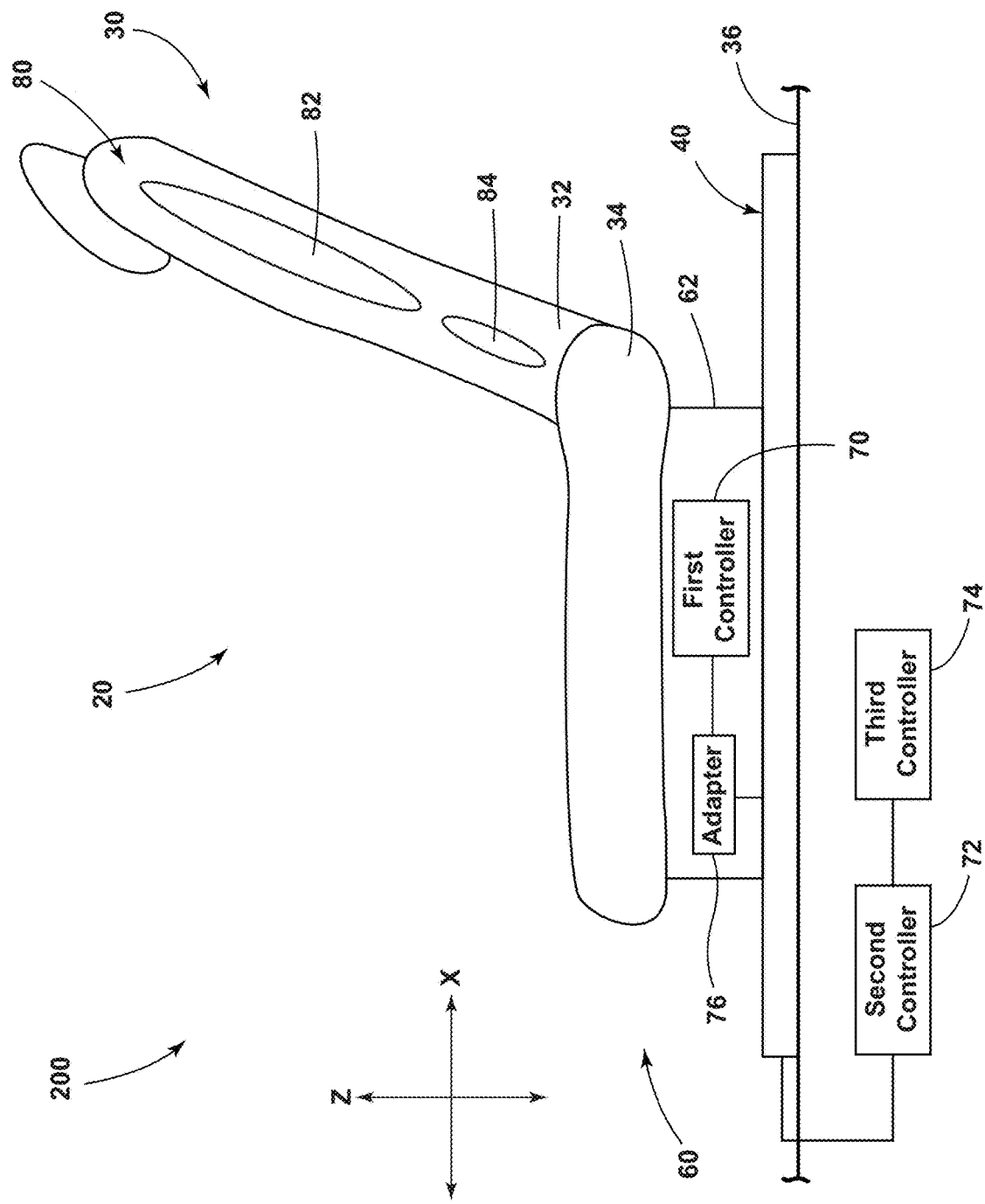
FIG. 1 is a side view generally illustrating an embodiment of an electrical assembly according to teachings of the present disclosure.

In embodiments, such as generally illustrated in FIG. 1, an electrical assembly 20 may include a track assembly 40 and/or a support assembly 60. The support assembly 60 may include a support member 62 and/or a seat 30. The support member 62 may be configured to support a seat 30 and may be configured to move (e.g., slide, roll, translate, etc.) with the seat 30 along the track assembly 40. The electrical assembly 20 may be configured to control (e.g., activate/deactivate, transfer trigger pulses, etc.) and/or monitor various safety devices 80 within a vehicle 200. The electrical assembly 20 may activate various safety devices 80, such as when sensing a crash event or imminent crash event, and/or the electrical assembly 20 may monitor the operating status of various safety devices 80 at substantially all times. The electrical assembly 20 may be disposed within and/or connected to a vehicle 200.

Figure 2:
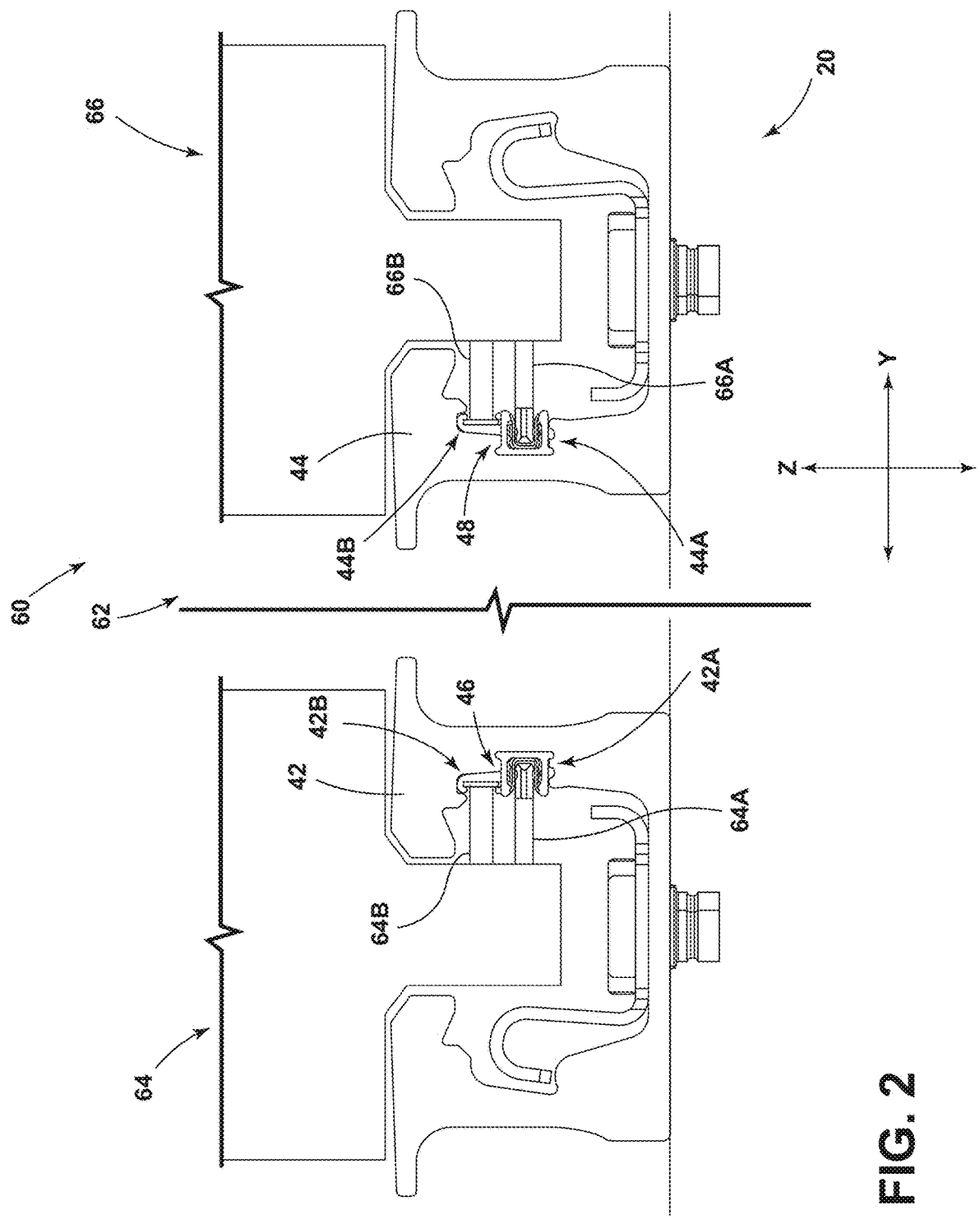
FIG. 2 is a cross-sectional view generally illustrating portions of an embodiment of an electrical assembly according to teachings of the present disclosure.

With embodiments, the electrical assembly 20 may include a track assembly 40. The track assembly 40 may include a first track 42 and/or a second track 44 (see, e.g., FIG. 2). The first track 42 and/or the second track 44 may be disposed on and/or connected to a mounting surface 36 (e.g., a vehicle floor). The first track 42 and/or the second track 44 may extend substantially in the X-direction. The first track 42 may be substantially parallel to the second track 44, and/or the first track 42 may be offset in the Y-direction from the second track 44. The first track 42 and/or the second track 44 may mechanically and/or electrically connect to a support assembly 60, such as to a support member 62 and/or a seat 30.

Figure 3:
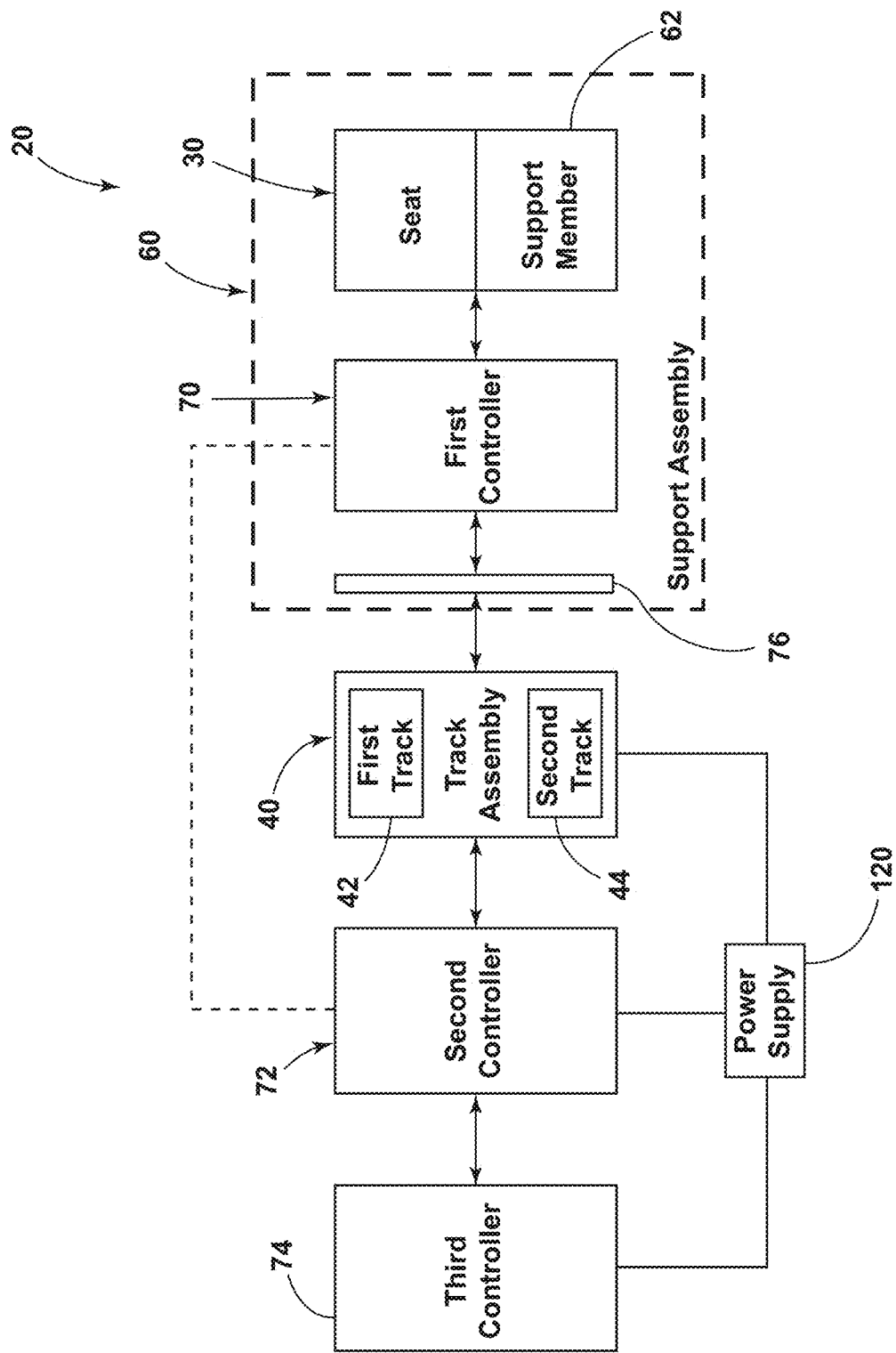
FIG. 3 is a schematic view generally illustrating an embodiment of an electrical assembly according to teachings of the present disclosure.

In embodiments, such as generally illustrated in FIG. 3, the first track 42 and/or the second track 44 may be electrically connected to a first controller 70 that may be connected to and/or incorporated with the support assembly 60. The first controller 70 may be connected to and/or disposed in the support member 62 and/or the seat 30. The first track 42 may include a first conductor 42A and/or a second conductor 42B. One or both of the conductors 42A, 42B may be electrically connected to the first controller 70. The second conductor 42B may be connected to a primary power supply 120 and may provide power to the first controller 70. The second track 44 may include a first conductor 44A and/or a second conductor 44B that may be electrically connected to the first controller 70. The conductors 42A, 42B, 44A, 44B may be disposed within a side of the tracks 42, 44. The tracks 42, 44 may include recesses/apertures 46, 48 configured to at least partially receive the conductors 42A, 42B, 44A, 44B. The conductors 42A, 42B, 44A, 44B may electrically connect to the support assembly 60 and/or various electrical components within the support assembly 60. The conductors 42A, 42B, 44A, 44B may be configured to provide power and/or to send signals/data via the first track 42 and/or the second track 44 to/from the support assembly 60 (e.g., the first controller 70).

In embodiments, the support member 62 may be configured to support the seat 30 and/or one or more items or components that may be disposed on or connected to the seat 30, such as an occupant. The seat 30 may include a seat back 32 and/or a seat base 34. The support member 62 may mechanically support the seat 30 on the track assembly 40. The support member 62 and/or the seat 30 may be configured to move along the track assembly 40 substantially in the X-direction. The seat 30 and/or the support member 62 may be configured to be selectively inserted into and/or selectively removed from the track assembly 40, such as in the Z-direction. The support assembly 60 may include, be connected to, and/or control/facilitate operation of one or more safety measures (e.g., for an occupant of the seat 30), such as via the first controller 70, which may be configured to receive and/or transfer trigger pulses. The support member 62 may include a first portion 64 and/or a second portion 66 that may be disposed opposite each other and may be configured for connection with the first track 42 and/or the second track 44. For example and without limitation, the first portion 64 may be connected to the first track 42 and the second portion 66 may be connected to the second track 44. Additionally or alternatively, the first portion 64 may be connected to the second track 44 and the second portion 66 may be connected to the first track 42. The first portion 64 may include a first contact 64A and a second contact 64B (e.g., electrical contacts). The second portion 66 may include a first contact 66A and a second contact 66B.

With embodiments, the first contacts 64A, 66A may be configured for electrical connection with the first conductors 42A, 44A of the first track 42 and the second track 44. For example, if the support assembly 60 is connected with the track assembly 40 in a first direction (e.g., facing the front of a vehicle 200), the first contact 64A of the first portion 64 may electrically connect with the first conductor 42A of the first track 42, and the first contact 66A of the second portion 66 may electrically connect with the first conductor 44A of the second track 44. Additionally or alternatively, if the support assembly 60 is connected with the track assembly 40 in a second direction (e.g., facing a rear of a vehicle 200), the first contact 64A of the first portion 64 may electrically connect with the first conductor 44A of the second track 44, and the first contact 66A of the second portion 66 may electrically connect with the first conductor 42A of the first track 42. The second contacts 64B, 66B may be configured for electrical connection with the second conductors 42B, 44B of the first track 42 and the second track 44. For example, if the support assembly 60 is connected with the track assembly 40 in a first direction, the second contact 64B of the first portion 64 may electrically connect with the second conductor 42B of the first track 42, and the second contact 66B of the second portion 66 may electrically connect with the second conductor 44B of the second track 44. Additionally or alternatively, if the support assembly 60 is connected with the track assembly 40 in a second direction, the second contact 64B of the first portion 64 may electrically connect with the second conductor 44B of the second track 44, and the second contact 66B of the second portion 66 may electrically connect with the second conductor 42B of the first track 42.

With embodiments, the first contacts 64A, 66A and/or the second contacts 64B, 66B may be movably connected with the support member 62. For example and without limitation, the first contacts 64A, 66A and the second contacts 64B, 66B may move (e.g., rotate, translate, etc.) into engagement with the conductors 42A, 42B, 44A, 44B to provide electrical connections and may move out of engagement with the conductors 42A, 42B, 44A, 44B to facilitate insertion/removal of the support assembly 60 into/from the track assembly 40 (e.g., in a Z-direction).

With embodiments, the support assembly 60 may include one or more safety devices 80. The safety devices 80 may include one or more of a variety of crash activated safety measures. For example and without limitation, the safety devices 80 may include air bags and/or pretensioners. The safety devices 80 may include and/or be activated/triggered by pyrotechnics. For example and without limitation, the safety devices 80 may be configured to rapidly/instantly expand (e.g., an air bag may inflate with air) upon activation. The safety devices 80 may be configured to be activated by a signal (e.g., a deployment current pulse) transmitted via the track assembly 40. The one or more safety devices 80 may include a first safety device 82 and/or a second safety device 84. The first safety device 82 and/or the second safety device 84 may be disposed in the seat back 32 and/or the seat base 34. The first safety device 82 and/or the second safety device 84 may be disposed proximate the seat 30 such as to contact and/or limit movement of an occupant when activated.

Figure 4:
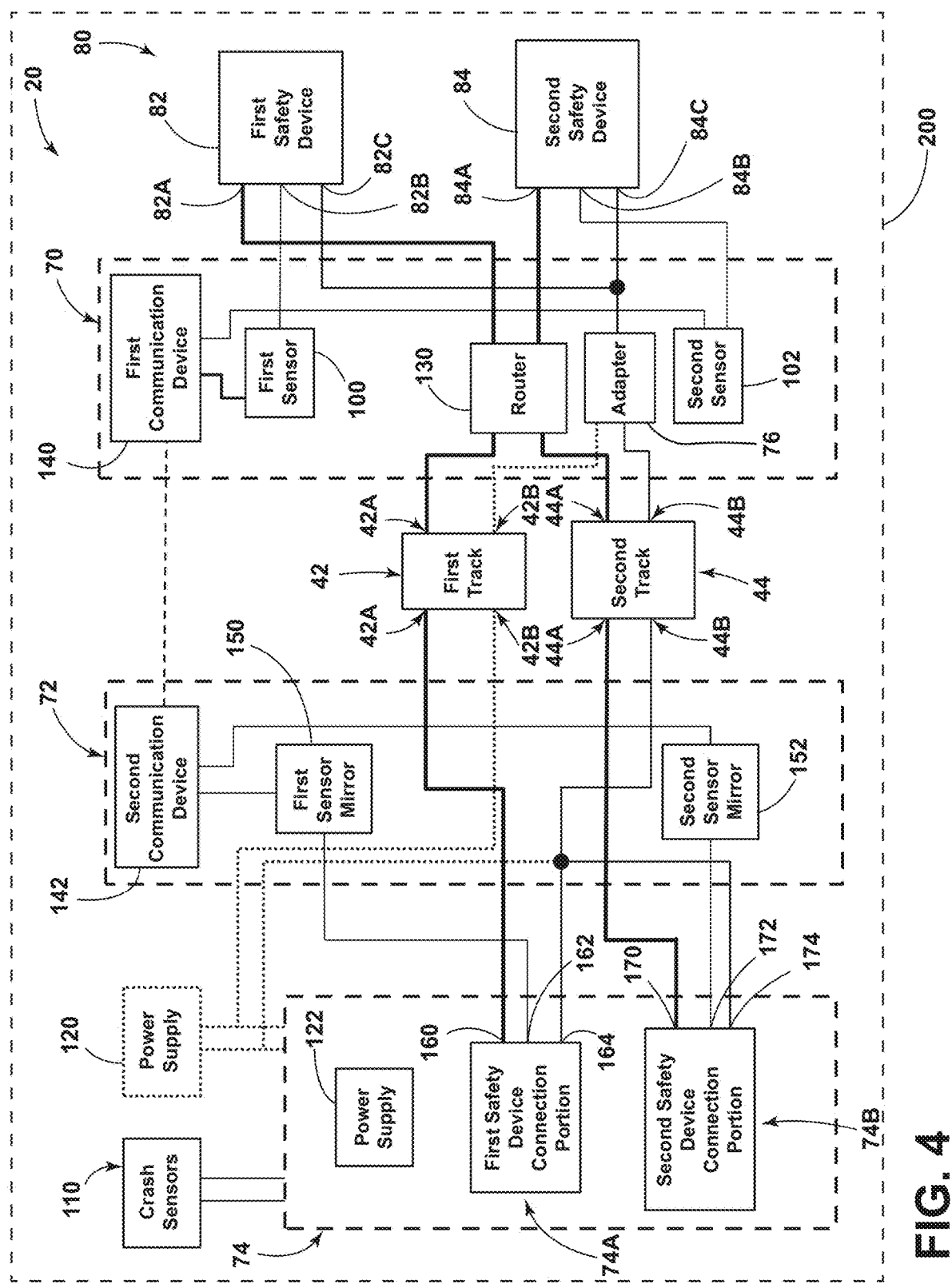
FIG. 4 is a schematic view generally illustrating an embodiment of an electrical assembly according to teachings of the present disclosure.

In embodiments, such as generally illustrated in FIG. 4, the first safety device 82 may include a first contact 82A, a second contact 82B, and/or a third contact 82C. The second safety device 84 may include a first contact 84A, a second contact 84B, and/or a third contact 84C. The first contacts 82A, 84A of the first safety device 82 and the second safety device 84 may be configured to receive a signal (e.g., a trigger signal and/or a digital signal) that may trigger/activate the safety device 82, 84 (e.g., ignite a pyrotechnic). The second contacts 82B, 84B of the first safety device 82 and/or the second safety device 84 may be connected to respective safety device sensors 100, 102. The safety device sensors 100, 102 may be configured for obtaining information about, reading, and/or determining the status of the first safety device 82 and/or the second safety device 84. The third contact 82C, 84C of the first safety device 82 and/or the second safety device 84 may be configured to communicate a low/return portion of a signal and/or may be connected to a ground (e.g., an electrical ground, such as a chassis/frame of a vehicle 200).

With embodiments, the support assembly 60 may include a first controller 70 that may be disposed within the support member 62 and/or within the seat 30. The first controller 70 may be configured to receive a first signal from the first conductor 42A, 44A of one of the first track 42 and the second track 44, and/or the first controller 70 may be configured to receive a second signal from the first conductor 42A, 44A of the other of the first track 42 and the second track 44. The first signal and/or the second signal may be trigger signals. The first controller 70 may be configured to provide the first signal to the first contact 82A of the first safety device 82 and/or provide the second signal to the first contact 84A of the second safety device 84. The first signal and/or the second signal may be configured to trigger (e.g., activate, ignite, etc.) the first safety device 82 and/or the second safety device 84, respectively. For example and without limitation, the safety devices 82, 84 may not be connected to a separate power supply and the first signal and the second signal may be sufficient on their own to deploy the safety devices 82, 84, respectively.

With embodiments, the electrical assembly 20 may include a second controller 72. The second controller 72 may be disposed in a vehicle 200, and/or the second controller 72 may not be disposed in the seat 30 and/or support member 62. The second controller 72 may be connected (e.g., electrically) to the first track 42, the second track 44, and/or the first controller 70. The second controller 72 may be configured to communicate with the first controller 70, such as via a wired/physical connection (e.g., via power line communication (PLC)) and/or via a wireless connection. For example and without limitation, the second controller 72 may be configured to generate the first signal and/or the second signal and may transmit the first signal and/or the second signal to the first controller 70 via the first conductor 42A, 44A and/or the second conductor 42B, 44B. Additionally or alternatively, the first controller 70 may wirelessly communicate (or via PLC) the status of the first safety device 82 and/or the second safety device 84 to the second controller 72. Communications with PLC may be conducted via the track assembly 40, such as without additional communication wiring connecting the track assembly 40 to the support assembly 60.

In embodiments, the electrical assembly 20 may include a third controller 74. The third controller 74 may be disposed in the vehicle 200 and/or may not be disposed in the seat 30 and/or the support member 62. The third controller 74 may be configured to determine if the safety devices 80 should be triggered (e.g., if a crash event has occurred or is imminent) and/or may be configured to generate (or cause the second controller 72 to generate) the first signal and/or the second signal. The third controller 74 may be connected to and/or may include one or more crash sensors 110. The crash sensors 110 may be configured to detect if a vehicle 200 is about to experience a collision and/or is experiencing a collision. The third controller 74 may be connected to a first/primary power supply 120 (e.g., a vehicle battery). The electrical assembly 20 may include a second/secondary power supply 122 (e.g., a battery, supercapacitor, etc.) that may be connected to and/or incorporated with the third controller 74. The third controller 74 may include a first safety device connection portion 74A and/or a second safety device connection portion 74B. The third controller 74 may receive information from the one or more crash sensors 110 and may communicate the first signal and/or the second signal via the first safety device connection portion 74A and/or the second safety device connection portion 74B to activate the safety devices 80. Additionally or alternatively, the third controller 74 may be configured to provide instruction to the second controller 72 via the safety device connection portions 74A, 74B to generate the first signal and/or the second signal to activate the safety devices 80. While the second controller 72 and the third controller 74 may be shown or described as separate components, the second controller 72 and the third controller 74 may be integrated, at least to some degree, with each other or one or more other controllers.

In embodiments, an electrical assembly 20 may include an adapter 76 that may be configured to automatically provide power of the correct polarity (e.g., from a power supply 120) to support assembly 60 and/or the first controller 70 regardless of the position/orientation of the support assembly 60 relative to the track assembly 40. An adapter 76 may, for example and without limitation, include a control circuit as described in U.S. patent application Ser. No. 16/294,289, which is hereby incorporated by reference in its entirety as though fully set forth herein.

With embodiments, the second conductor 42B of the first track 42 may be connected to a power supply (e.g., the primary power supply 120) and/or may connect the support assembly 60, including the first controller 70, to the primary power supply 120. The second conductor 44B of the second track 44 may be connected to a ground (e.g., an electrical ground) and/or may connect the support assembly 60, including the first controller 70, to ground.

In some instances, the primary power supply 120 may not be active and/or the second conductor 44B of the second track 44 may not be connected to a ground. For example and without limitation, in the event of a crash event (e.g., an unexpected event), the primary power supply 120 may be shut off and/or disconnected from the electrical assembly 20. The electrical assembly 20 may be configured to trigger/activate the safety devices 80 even in such instances (e.g., the electrical assembly 20 may be configured to trigger the safety devices 80 even when the electrical assembly 20 is not receiving power from a primary power supply 120, such as from the vehicle battery).

With embodiments, the first controller 70 may be connected to the third contact 82C of the first safety device 82 and/or the third contact 84C of the second safety device 84. The first controller 70 may connect the third contact 82C of the first safety device 82 to the third contact 84C of the second safety device 84. The first controller 70 may connect the third contacts 82C, 84C to the second track 44 (e.g., the second conductor 44B of the second track 44).

In embodiments, the first controller 70 may include a router 130. The router 130 may be connected to the first track 42, the second track 44, the first safety device 82, and/or the second safety device 84. The router 130 may receive the first signal (e.g., a first trigger signal) from the one of the first track 42 and the second track 44, and/or may receive the second signal (e.g., a second trigger signal) from the other of the first track 42 and the second track 44. The router 130 may transmit (e.g., send) the first signal to the first safety device 82 and/or the second signal to the second safety device 84. The router 130 may be configured to determine which signal is being transmitted via the first contact 64A of the first portion 64 and which signal is being transmitted via the first contact 66A of the second portion 66. If the support assembly 60 is connected to the track assembly 40 in a first direction (e.g., facing the front of the vehicle 200), the first signal may be transmitted via the first contact 64A of the first portion 64 (which may be connected to the first conductor 42A of the first track 42) and the second signal may be transmitted via the first contact 66A of the second portion 66 (which may be connected to the first conductor 44A of the second track 44). If the support assembly 60 is connected to the track assembly 40 in a second direction (e.g., facing a rear of the vehicle 200), the first signal may be transmitted via the first contact 66A of the second portion 66 (which may be connected to the first conductor 42A of the first track 42) and the second signal may be transmitted via the first contact 64A of the first portion 64 (which may be connected to the first conductor 44A of the second track 44). The router 130 may provide the first signal to the first safety device 82 regardless of the contact 64A, 66A via which the first signal is transmitted. The router 130 may provide the second signal to the second safety device 84 regardless of the contact 64A, 66A via which the second signal is transmitted.

In embodiments, the router 130 may be configured to analyze the signals provided to the router 130 and determine which signal is the first signal and which signal is the second signal. For example and without limitation, the first signal and the second signal may include different properties (e.g., amplitude, duty cycle, frequency, timing, etc.) and the router 130 may be configured to identify the signals according to one or more different properties. Additionally or alternatively, one or more of the first controller 70, the second controller 72, and the third controller 74 (or another controller) may be configured to determine an orientation of the support assembly 60 and may provide information regarding the orientation of the support assembly 60 to the router 130. If the router 130 receives information indicating that the support assembly 60 is connected to the track assembly 40 in the first direction, the router 130 may provide the signal from the first conductor 42A of the first track 42 (via the first contact 64A) to the first safety device 82 and/or may provide the signal from the first conductor 44A of the second track 44 (via the first contact 66A) to the second safety device 84. If the router 130 receives information indicating that the support assembly 60 is connected to the track assembly 40 in the second direction, the router 130 may provide the signal from the first conductor 42A of the first track 42 (via the first contact 66A) to the first safety device 82 and/or may provide the signal from the first conductor 44A of the second track 44 (via the first contact 64A) to the second safety device 84.

With embodiments, the first controller 70 may include or be connected to one or more safety device sensors, such as a first sensor 100 and/or a second sensor 102. The first sensor 100 and/or the second sensor 102 may read (e.g., receive, monitor, etc.) a status of the first safety device 82 and/or a status of the second safety device 84, respectively. The first sensor 100 may be connected to the second contact 82B of the first safety device 82 and/or the second sensor 102 may be connected to the second contact 84B of the second safety device 84.

In embodiments, the first controller 70 may be configured to transmit information from the first sensor 100 and/or the second sensor 102, such as to the second controller 72. For example and without limitation, the first sensor 100 and/or the second sensor 102 may be connected to a first communication device 140 (e.g., via PLC or wireless communication) that may be configured to transmit a first sensor signal from the first sensor 100 and/or transmit a second sensor signal from the second sensor 102 to the second controller 72.

With embodiments, the second controller 72 may include a second communication device 142 (e.g., a device configured to communicate via PLC or wirelessly), a first sensor mirror 150, and/or a second sensor mirror 152. The first communication device 140 of the first controller 70 may transmit a first sensor signal from the first sensor 100 and/or a second sensor signal from the second sensor 102 to the second communication device 142 (e.g., via PLC or wirelessly). The first communication device 140 and/or the second communication device 142 may provide the first sensor signal to the first sensor mirror 150 and/or may provide the second sensor signal to the second sensor mirror 152 (e.g., via PLC or wirelessly). The first sensor mirror 150 and/or the second sensor mirror 152 may function to effectively duplicate the status of the first safety device 82 and/or the second safety device 84, respectively. The first sensor mirror 150 may be connected to the first safety device connection portion 74A of the third controller 74. The second sensor mirror 152 may be connected to the second safety device connection portion 74B of the third controller 74.

With embodiments, the first safety device connection portion 74A may include a first contact 160, a second contact 162, and/or a third contact 164 (e.g., high, sense, and low contacts). The first contact 160 may be connected to the first conductor 42A of the first track 42. The third controller 74 may generate and provide the first signal to the second controller 72 (or instruct the second controller 72 to generate the first signal), and the second controller 72 may provide the first signal to the first controller 70 via the first conductor 42A to activate the first safety device 82. The second contact 162 may be connected to the first sensor mirror 150. The third contact 164 may be connected to the second conductor 44B of the second track 44, which may be connected to ground.

In embodiments, the second safety device connection portion 74B may include a first contact 170, a second contact 172, and/or a third contact 174 (e.g., high, sense, and low contacts). The first contact 170 may be connected to the first conductor 44A of the second track 44. The third controller 74 may generate and provide the second signal to the second controller 72 (or instruct the second controller 72 to generate the second signal), and the second controller 72 may provide the second signal to the first controller 70 via the first conductor 44A to activate the second safety device 84. The second contact 172 may be connected to the second sensor mirror 152. The third contact 164 may be connected to the second conductor 44B of the second track 44 (e.g., the ground) and/or the third contact 174 of the first safety device connection portion 74A.

With embodiments, the third controller 74 may monitor (e.g., wirelessly or via PLC) the status of the first safety device 82 and/or the second safety device 84 via the first sensor mirror 150 and/or the second sensor mirror 152, respectively. The third controller 74 may be configured to determine the status of the safety devices 80, control the safety devices 80 according to the determined status, and/or activate the safety devices 80 upon sensing a crash via the crash sensors 110.

Figure 5:
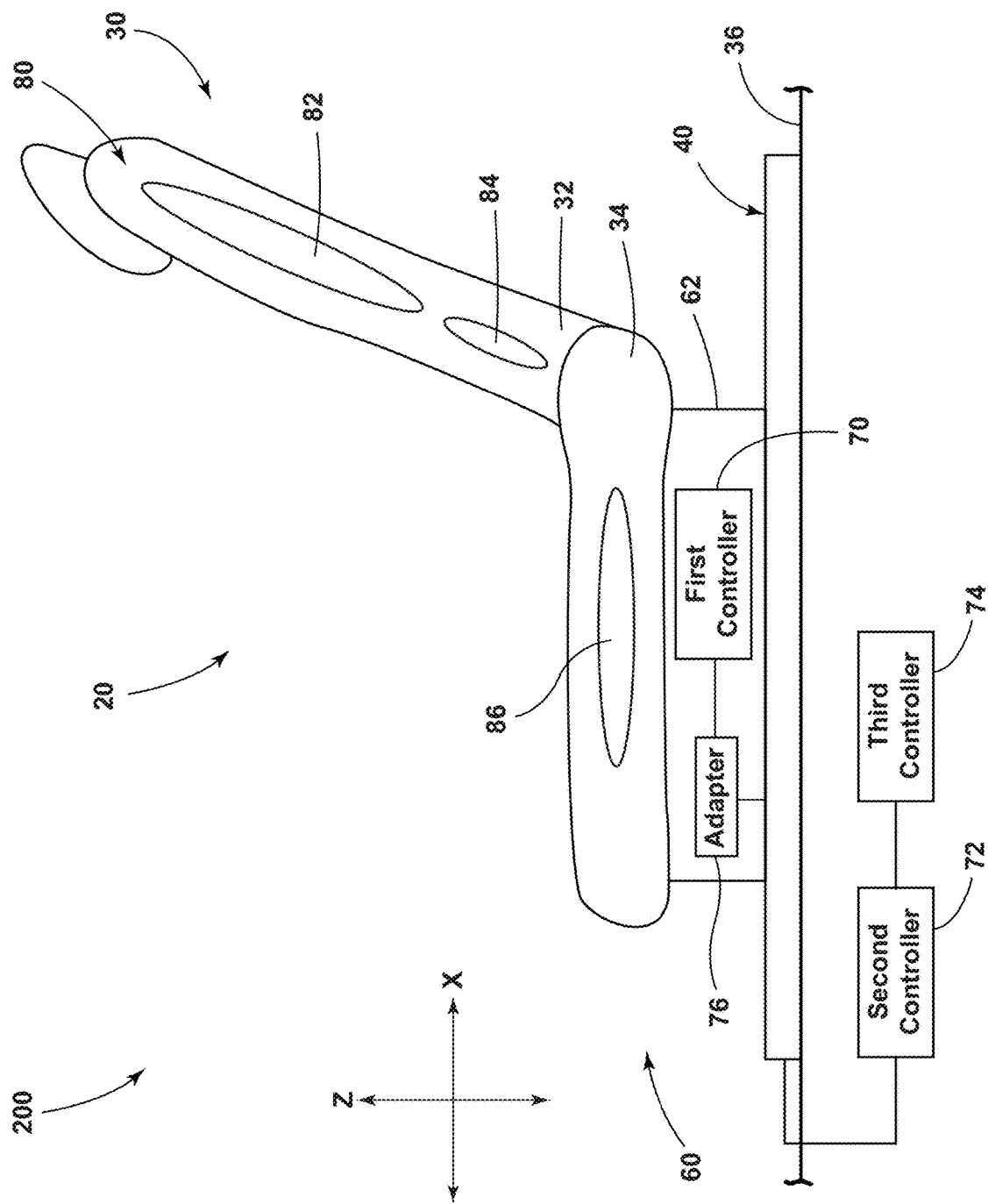
FIG. 5 is a side view generally illustrating an embodiment of an electrical assembly according to teachings of the present disclosure.

In embodiments, such as generally illustrated in FIG. 5, a support assembly 60 of an electrical assembly 20 may include one or more safety devices 80. For example and without limitation, the one or more safety devices 80 may include a first safety device 82, a second safety device 84, and/or a third safety device 86.

Figure 6A:
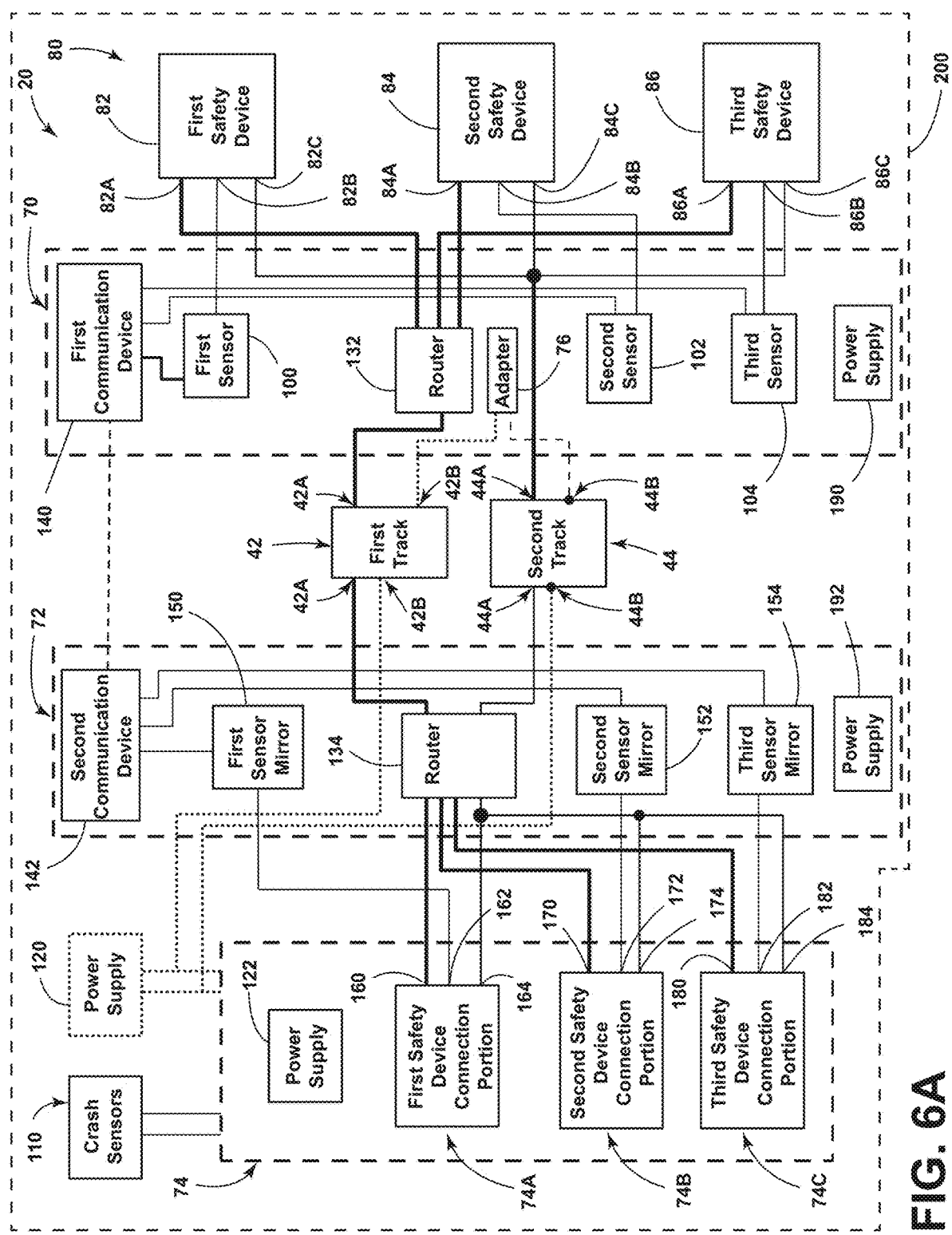
FIG. 6A is a schematic view generally illustrating an embodiment of an electrical assembly according to teachings of the present disclosure.
Figure 6B:
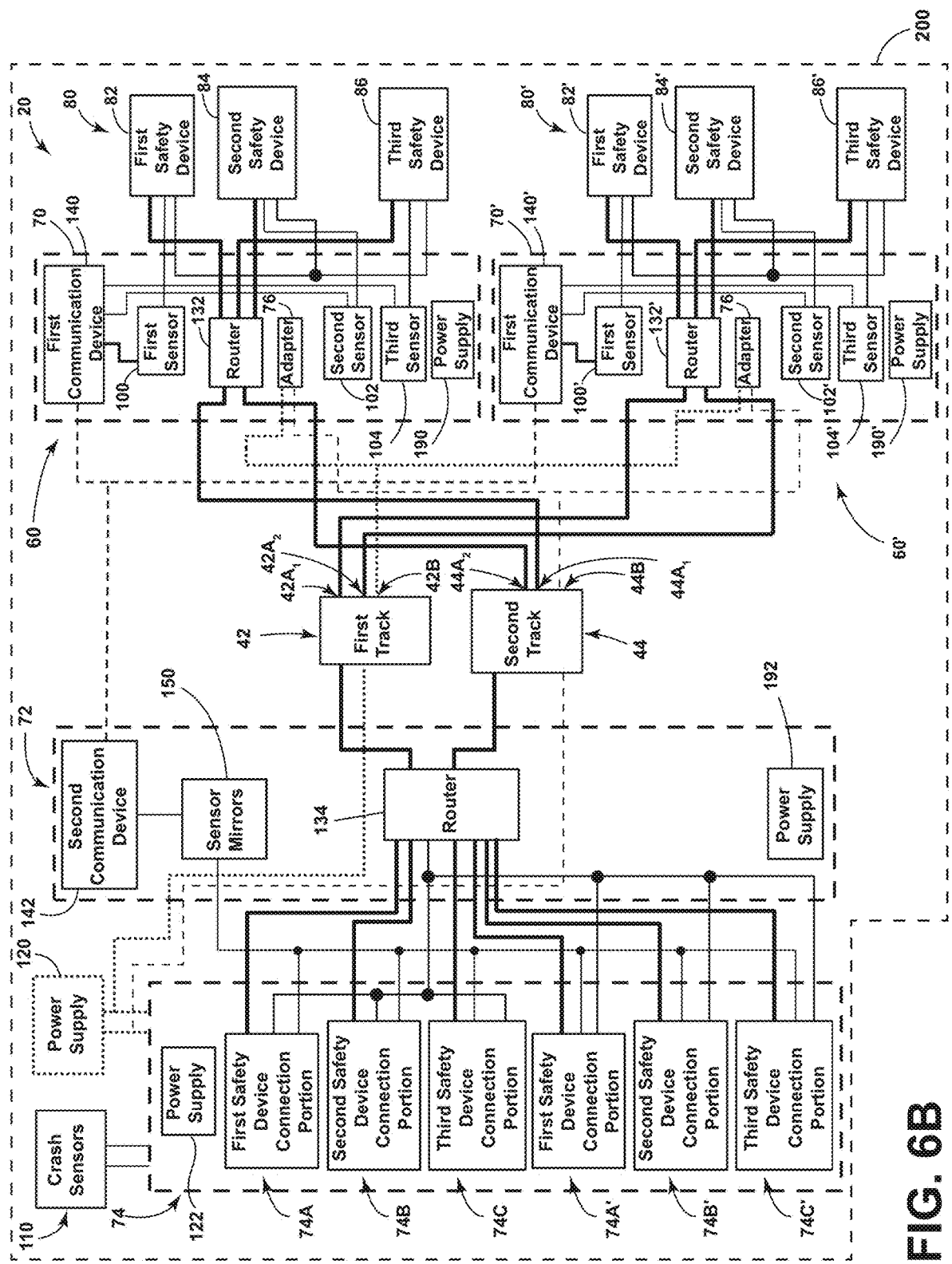
FIG. 6B is a schematic view generally illustrating an embodiment of an electrical assembly according to teachings of the present disclosure.
Figure 7A:
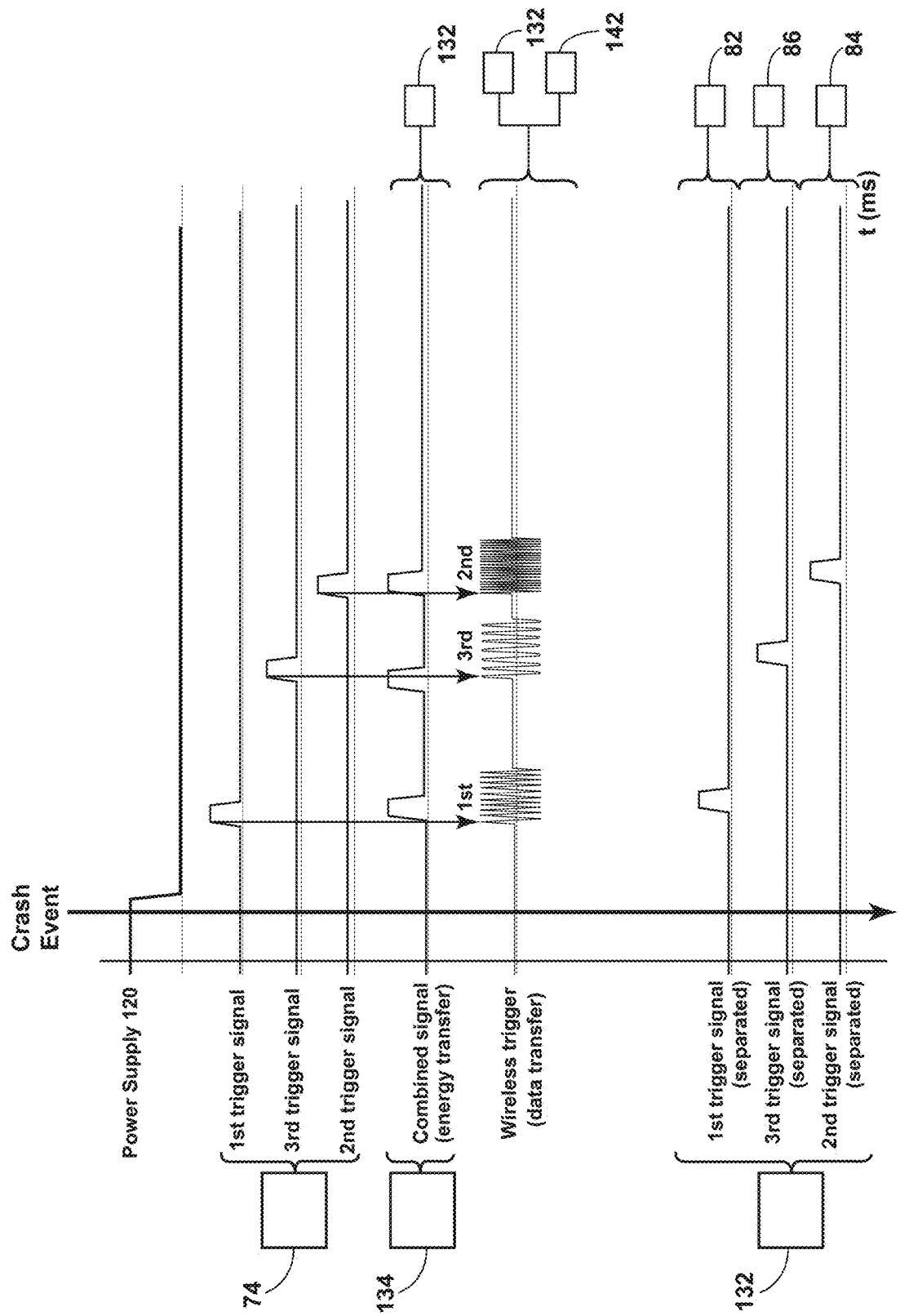
FIG. 7A is a graphical representation of trigger signals of an embodiment of an electrical assembly according to teachings of the present disclosure.
Figure 7C:
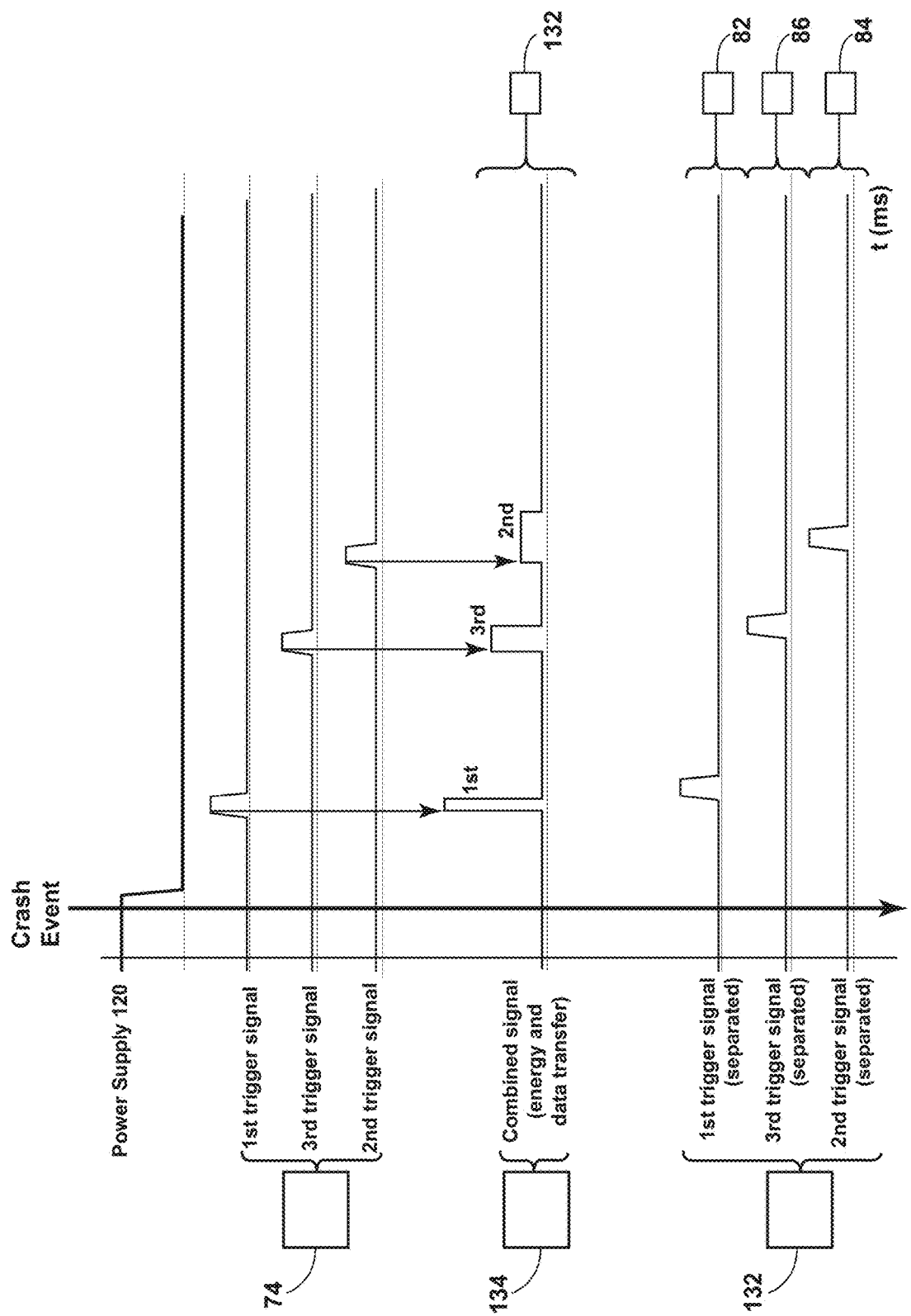
FIG. 7C is a graphical representation of trigger signals of an embodiment of an electrical assembly according to teachings of the present disclosure.
Figure 7D:
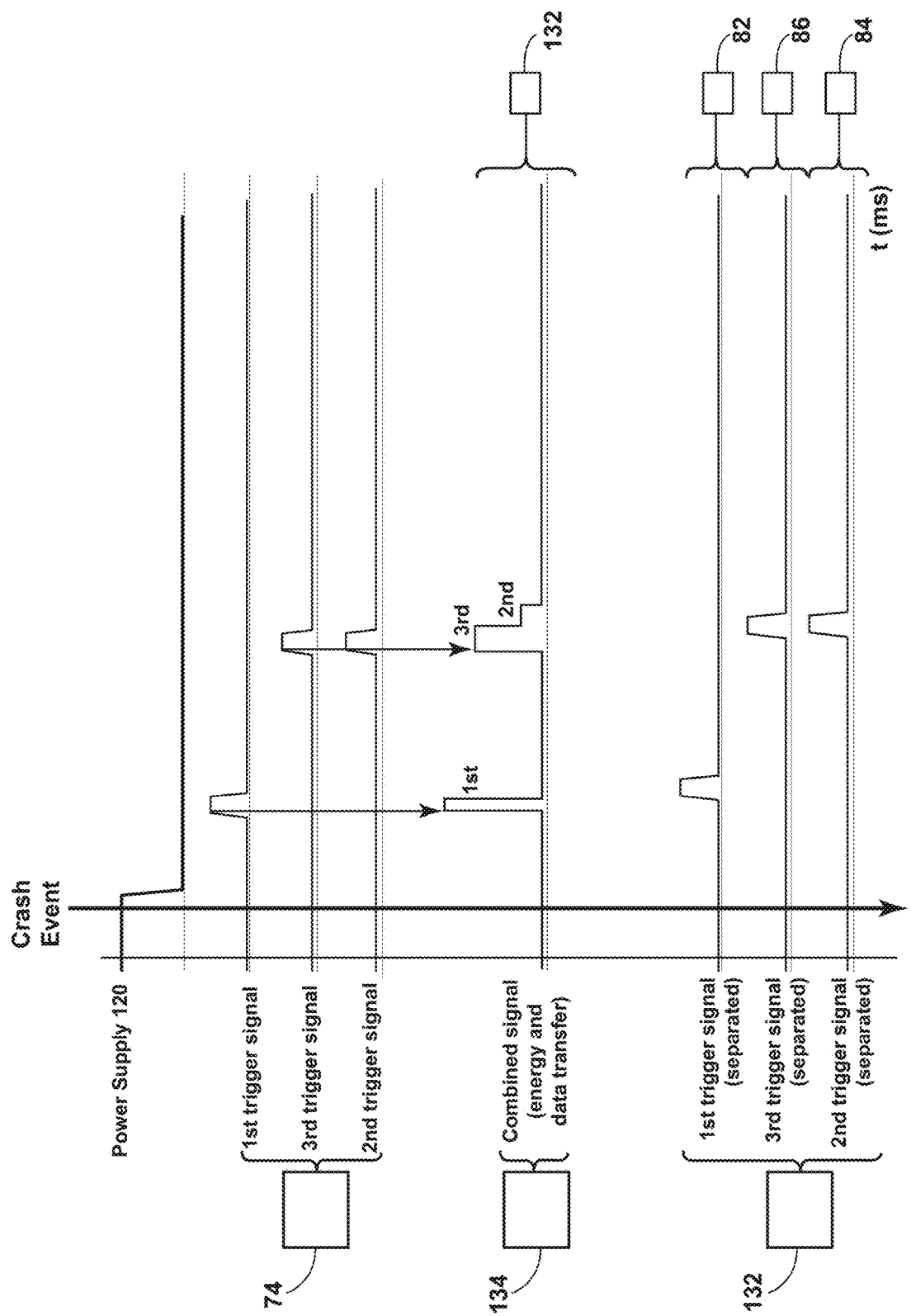
FIG. 7D is a graphical representation of trigger signals of an embodiment of an electrical assembly according to teachings of the present disclosure.

With embodiments, such as generally illustrated in FIGS. 6A and 6B, the safety devices 80 may be configured to be activated by respective trigger signals (e.g., deployment current pulses) that may be transmitted via the track assembly 40. For example and without limitation, the first safety device 82, the second safety device 84, and/or the third safety device 86 may be activated by respective trigger signals transmitted via a single conductor of the track assembly 40, such as via the first conductor 42A of the first track 42. A second single conductor (e.g., conductor 44A) may be utilized to transmit return signals. The first safety device 82 may include a first contact 82A, a second contact 82B, and/or a third contact 82C. The second safety device 84 may include a first contact 84A, a second contact 84B, and/or a third contact 84C. The third safety device 86 may include a first contact 86A, a second contact 86B, and/or a third contact 86C. The first contacts 82A, 84A, 86A of the safety devices 82, 84, 86 may be configured to receive a signal (e.g., a trigger signal and/or a digital signal) that may trigger/activate the safety devices 82, 84, 86 (e.g., ignite a pyrotechnic).

In embodiments, the electrical assembly 20 may include safety device sensors 100, 102, 104. The safety device sensors 100, 102, 104 may be configured for obtaining information about, reading, and/or determining the status of the first safety device 82, the second safety device 84, and/or the third safety device 86. The safety device sensors 100, 102, 104 may be connected to the first communication device 140. The first safety device sensor 100 may be connected to the first communication device 140 and/or the first safety device 82. The second safety device sensor 102 may be connected to the first communication device 140 and/or the second safety device 84. The third safety device sensor 104 may be connected to the first communication device 140 and/or the third safety device 86. The first controller 70 may be configured to provide information from the safety device sensors 100, 102, 104 to the second controller 72 via the first communication device 140, such as using power line communication (PLC) and/or wireless communication, such as radio frequency (RF) communication.

With embodiments, such as generally illustrated in FIGS. 6A and 6B, the third controller 74 may be configured to determine if the safety devices 80 should be triggered (e.g., if a crash event has occurred or is imminent) and/or may be configured to generate a first trigger signal, a second trigger signal, and/or a third trigger signal. The trigger signals may, for example and without limitation, be configured as 2-amp pulses that may include a duration of about 2 ms. The third controller 74 may include a first safety device connection portion 74A, a second safety device connection portion 74B, and/or a third safety device connection portion 74C. The third controller 74 may receive information from the one or more crash sensors 110 and may communicate the first trigger signal, the second trigger signal, and/or the third trigger signal via the first safety device connection portion 74A, the second safety device connection portion 74B, and/or the third safety device connection portion 74C to activate the safety devices 80.

In embodiments, the third controller 74 may be configured to determine and/or receive (e.g., from the second controller 72) information about an orientation of the support assembly 60 and may modify a sequence of the trigger signals according to the orientation of the support assembly 60. For example and without limitation, if the support assembly is disposed in a first orientation (e.g., facing forward), the third controller 74 may provide a first sequence of trigger signals (e.g., first, second, third) and if the support assembly 60 is disposed in a second orientation (e.g., facing rearward), the third controller 74 may provide a second sequence of trigger signals (e.g., third, second, first).

In embodiments, the first controller 70 and/or the second controller 72 may include a first router 132 and/or a second router 134, respectively. For example and without limitation, the second router 134 may be configured as a trigger integrator that may be configured to combine/integrate a plurality of trigger signals into a combined trigger signal. The first router 132 may be configured as a trigger distributor that may be configured to separate and/or distribute trigger signals from the combined trigger signal. The second router 134 may be configured to receive the first trigger signal, the second trigger signal, and/or the third trigger signal from the third controller 74 (e.g., via the safety device connection portions 74A, 74B, 74C). The second router 134 may be configured to combine the first trigger signal, the second trigger signal, and/or the third trigger signal into a combined signal (e.g., with a plurality of deployment current pulses) and/or transmit the combined signal from the second controller 72 to the first controller 70 via the first conductor 42A of the first track 42.

With embodiments, an electrical assembly 20 may include any number of safety devices 80 and/or safety device connection portions 74A, 74B, 74C without changing the electrical connection between the first controller 70 and the second controller 72. For example and without limitation, the first router 132 (e.g., the first controller 70) and the second router 134 (e.g., the second controller 72) may be configured to combine and/or separate any number of trigger signals and transmit the combined signal over a single conductor (e.g., the first conductor 42A of the first track 42). Including a first router 132 and a second router 134 in the electrical assembly 20 may not limit the number of safety devices 80 that may be connected to the first controller 70. Similarly, the electrical assembly 20 may include a first router 132 and a second router 134 that may be configured to combine and separate trigger signals for a first safety device 82 and a second safety device 84 (e.g., even if the electrical assembly 20 includes only two safety devices 80).

With embodiments, the support assembly 60 and/or the first controller 70 may include a power supply 190 (e.g., a battery, capacitor, supercapacitor, etc.) that may be configured to provide, at least temporarily, power for the first controller 70 and/or the first router 132 (e.g., during a crash event), such that the first trigger signal, the second trigger signal, and/or the third trigger signal may be successfully received (e.g., separated) and distributed/transmitted to the safety devices 80 even if the power supply 120 and/or the power supply 122 are disconnected or not operational. The second controller 72 may include a power supply 192 (e.g., a battery, capacitor, supercapacitor, etc.) that may be configured to provide power, at least temporarily, for the second controller 72 and/or the second router 134 (e.g., during a crash event), such that the first trigger signal, the second trigger signal, and/or the third trigger signal may be successfully transmitted (e.g., integrated/combined) if the power supply 120 and/or the power supply 122 are disconnected or not operational. One or more of the power supply 122, the power supply 190, and the power supply 192 may be charged and/or recharged via the power supply 120.

With embodiments, the first router 132 may be wirelessly controlled (e.g., via a dedicated wireless trigger, such as magnetic coupling, infra-red transmission, etc.), at least in part, by the second controller 72 via the first communication device 140 and the second communication device 142. For example and without limitation, the second controller 72 may communicate information regarding how the trigger signals have been combined and/or how the combined signal can be separated to the first controller 70 (and the first router 132) via the second communication device 142 providing the information to the first communication device 140.

In embodiments, an electrical assembly 20 may be configured as a non-deterministic system (e.g., the characteristics, such as the order of trigger pulses, of the combined signal may not be known in advance). For example and without limitation, if the electrical assembly 20 is a non-deterministic system, the electrical assembly 20 may be configured for communication between the first communication device 140 and the second communication device 142 to correctly trigger/activate the safety devices 82, 84, 86 (see, e.g., FIGS. 7A, 7B, 7C, and 7D). The third controller 74 may be configured to generate a first trigger signal, a second trigger signal, and/or a third trigger signal after receiving a signal from the crash sensors 110.

In embodiments, a combined trigger signal may include an energy transfer from the second router 134 to the first router 132 and/or the wireless trigger may include a data transfer from the second router 134 to the first router 132. The combined signal may be transmitted via the first track 42 and/or the wireless signal may be transmitted via the first communication device 140 and the second communication device 142 (e.g., between the first router 132 and the second router 134).

With embodiments, the second controller 72 may combine trigger signals generated by the third controller 74 and may transmit a combined signal and/or a wireless trigger to the first controller 70, such as via the track assembly 40 and/or the communication devices 140, 142. The first router 132 may be configured to receive and/or combine the combined signal and the wireless trigger signal (e.g., combine an energy signal and/or a data signal) and send a respective signal to each of the first safety device 82, the second safety device 84, and/or the third safety device 86 (see, e.g., FIGS. 7A and 7B). The combined signal and/or the wireless trigger may be combined through a single transmission path in which the first router 132 and/or the second router 134 may include the capability for energy and/or data multiplexing and demultiplexing. The first sensor 100, the second sensor 102, the third sensor 104, the first communication device 140, the second communication device 142, the first sensor mirror 150, the second sensor mirror 152, and/or the third sensor mirror 154 may be redundant with respect to communication between the first router 132 and/or the second router 134. In embodiments, the second router 134 may combine information and the energy information into an energy transfer signal that may be received by the first router 132. In combining the energy information and the data information, the second router 134 may transmit different triggering shapes such that if the triggering signals overlap, the first controller 70 and/or the first router 132 may properly identify the respective trigger signals and the safety devices 80 may be correctly activated/triggered (see, e.g., FIGS. 7C and 7D). The second router may, for example and without limitation, modify amplitudes and/or frequencies of the triggering signals for transmitting the triggering signals to the first router 132. The first router 132 may provide a first trigger signal, a second trigger signal, and/or a third trigger signal (from the combined energy and data transfer) and transmit the trigger signals to the respective safety devices 82, 84, 86.

Figure 8:
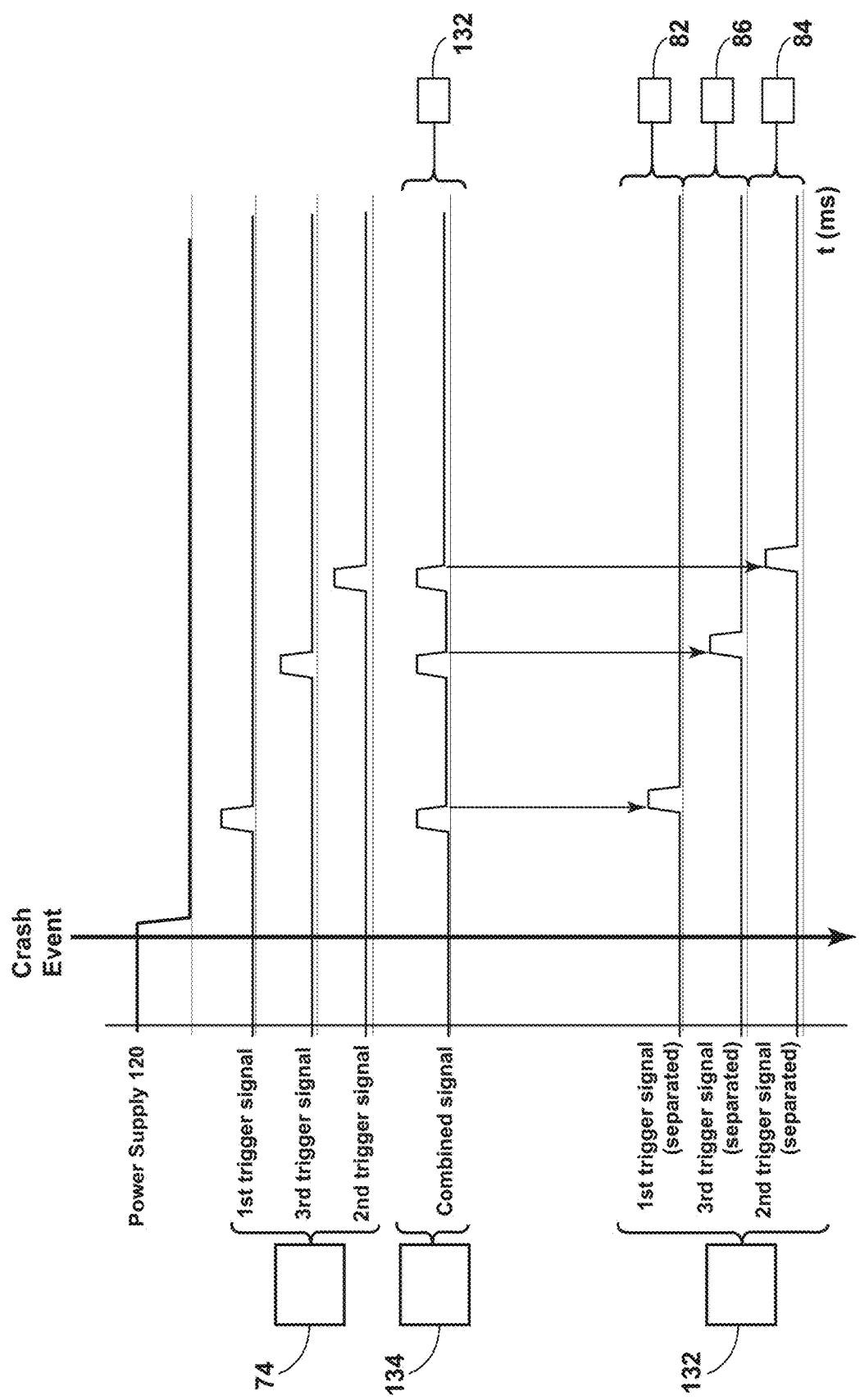
FIG. 8 is a graphical representation of trigger signals of an embodiment of an electrical assembly according to teachings of the present disclosure.

With embodiments, an electrical assembly 20 may be configured as a deterministic system (e.g., characteristics of the combined signal may be known in advance and/or may always be substantially the same). For example and without limitation, if the electrical assembly 20 is a deterministic system, communication between the first communication device 140 and the second communication device 142 may not be involved to correctly select the safety devices 82, 84, 86 to be triggered/activated. The first router 132 may receive and/or be preconfigured with the trigger pulse order and may be configured to change to the next respective channel/safety device 80 after the falling edge of the previous pulse (see, e.g., FIG. 8).

With embodiments, the third safety device connection portion 74C may include a first contact 180, a second contact 182, and/or a third contact 184. The first contact 160 of the first safety device connection portion 74A, the first contact 170 of the second safety device connection portion 74B, and/or the first contact 180 of the third safety device connection portion 74C may be connected to the second router 134. The second contact 162 of the first safety device connection portion 74A may be connected to the first sensor mirror 150. The second contact 172 of the second safety device connection portion 74B may be connected to the second sensor mirror 152. The second contact 182 of the third safety device connection portion 74C may be connected to a third sensor mirror 154. The first sensor mirror 150, the second sensor mirror 152, and/or the third sensor mirror 154 may be connected to the second communication device 142.

In embodiments, the third contact 164 of the first safety device connection portion 74A, the third contact 174 of the second safety device connection portion 74B, and/or the third contact 184 of the third safety device connection portion 74C may be connected to the first conductor 44A of the second track 44. The first conductor 44A of the second track 44 may be connected to the third contact 82C of the first safety device 82, the third contact 84C of the second safety device 84, and/or the third contact 86C of the third safety device 86. The first conductor 44A of the second track 44 may connect the low contacts 164, 174, 184 of the safety device connection portions 74A, 74B, 74C to the low contacts 82C, 84C, 86C of the safety devices 82, 84, 86, respectively.

Figure 9:
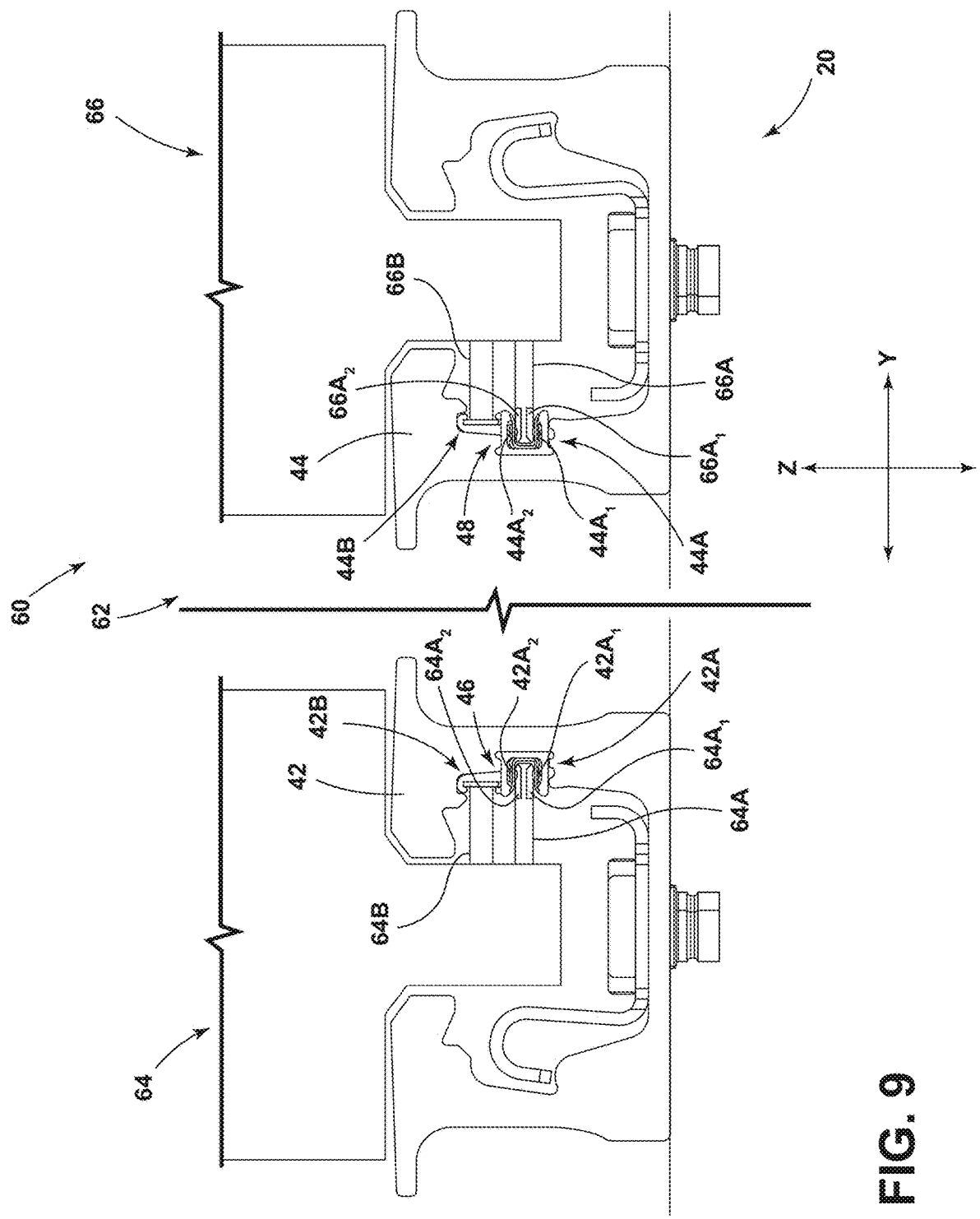
FIG. 9 is a cross-sectional view generally illustrating portions of an embodiment of an electrical assembly according to teachings of the present disclosure.

In embodiments, such as generally illustrated in FIG. 6B, an electrical assembly 20 may include a plurality of safety devices 80. The plurality of safety devices 80 may exceed the number of safety conductors of a track assembly 40. For example and without limitation, a first support assembly 60 and a second support assembly 60' of an electrical assembly 20 may include first safety devices 82, 82', second safety devices 84, 84', and/or third safety devices, 86, 86' (e.g., six safety devices); and/or a track assembly 40 may include conductor portions 42A₁, 42A₂, 44A₁, 44A₂ and/or conductors 42B, 44B (e.g., four safety conductors and two power conductors, such as generally illustrated in FIG. 9). The router 134 of the second controller 72 may be configured to combine trigger signals from safety device connection portions 74A, 74B, 74C, 74A', 74B', 74C' of the third controller 74. The router 134 may provide a plurality of trigger signals for each support assembly 60, 60' to a respective safety conductor (for each support assembly 60, 60') of the track assembly 40. For example and without limitation, the router 134 may provide trigger signals for safety devices 82, 84, 86 to the conductor portion 44A₁ and may be configured to receive return signals for safety devices 82, 84, 86 from the conductor portion 44A₂. Additionally or alternatively, the router 134 may provide trigger signals for safety devices 82', 84', 86' to the conductor portion 42A₁ and may be configured to receive return signals for safety devices 82', 84', 86' from the conductor portion 42A₂. With such a configuration, the electrical assembly may be configured to provide a plurality of trigger signals to a support assembly 60, 60' via a single safety conductor/conductor portion, which may involve fewer safety conductors/conductor portions than some other designs.

With embodiments, return signals from all safety devices 82, 82', 84, 84', 86, 86' may be combined and/or transmitted via a single conductor (e.g., conductor portion 44A₂). Such a configuration may be used, for example and without limitation, if one or more additional support assemblies 60 (e.g., a third support assembly) is connected to the track assembly 40. The router 134 may provide trigger signals for safety devices 80 that may be connected to an additional support assembly 60 to conductor portion 42A₂ and may also receive return signals from the safety devices 80 of the third support assembly 60 via conductor portion 44A₂.

In embodiments, the router 134 may be configured to provide trigger signals for different support assemblies 60 via the same conductor/conductor portion. For example and without limitation, the router 134 may provide trigger signals for a safety device 82 of a first support assembly 60 and a safety device 84 of a second support assembly 60' via conductor portion 42A₁. The controllers 70, 70' and/or the routers 132, 132' may be configured to receive the combined signal and determine which signal should be provided to the safety device(s) associated with the corresponding support assembly 60, 60'.

With embodiments, the first controller(s) 70 may be configured to communicate with the second controller 72 to determine which safety devices 80 are grouped together (and for which trigger signals may be combined on the same conductor). A trigger sequence that may be utilized by the third controller 74 may be communicated between the first controller 70 and the second controller 72, such as via wired communication (e.g., PLC) and/or wireless communication (e.g., RF). The first controller 70 and the second controller 72 may cooperate to determine a path for each combination of safety devices 80 (e.g., one conductor per support assembly 60). Once a path is determined, the first controller 70 and the second controller 72 may connect the output of the third controller 74 to the proper conductor and/or contact (e.g., a safety device deployment line) until a deployment pulse ends. The first controller 70 and the second controller 72 may then, if applicable, connect the output of the third controller 74 to the next safety device deployment line, and repeat the process until a deployment sequence is complete. If the configuration of one or more support assemblies 60 changes, the first controller 70 and the second controller 72 may cooperate to determine a new path for each combination of safety devices 80.

In embodiments, such as generally illustrated in FIG. 9, a track assembly 40 may include two conductors for electrical power (e.g., the conductors 42B, 44B) and/or may include a plurality of conductors that may be utilized in connection with safety devices 80. For example and without limitation, the conductors 42A, 44A may each include two separate conductor portions $42A_1$, $42A_2$, $44A_1$, $44A_2$ that may each act as a separate conductor such that the track assembly 40 includes four conductors that may be utilized in connection with safety devices 80 (e.g., four safety conductors) and two conductors that may be utilized for electrical power (e.g., six total conductors). In embodiments, the contacts 64B, 66B may be configured for selective connection with the conductors 42B, 44B, respectively, and the contacts 64A, 66A may include separate contact portions $64A_1$, $64A_2$, $66A_1$, $66A_2$ that may each function as a separate contact such that the support assembly 60 includes four contacts that may be utilized in connection with safety devices 80. The contact portions $64A_1$, $64A_2$, $66A_1$, $66A_2$ may be configured to selectively electrically connect with the conductor portions $42A_1$, $42A_2$, $44A_1$, $44A_2$, respectively.

Figure 10:
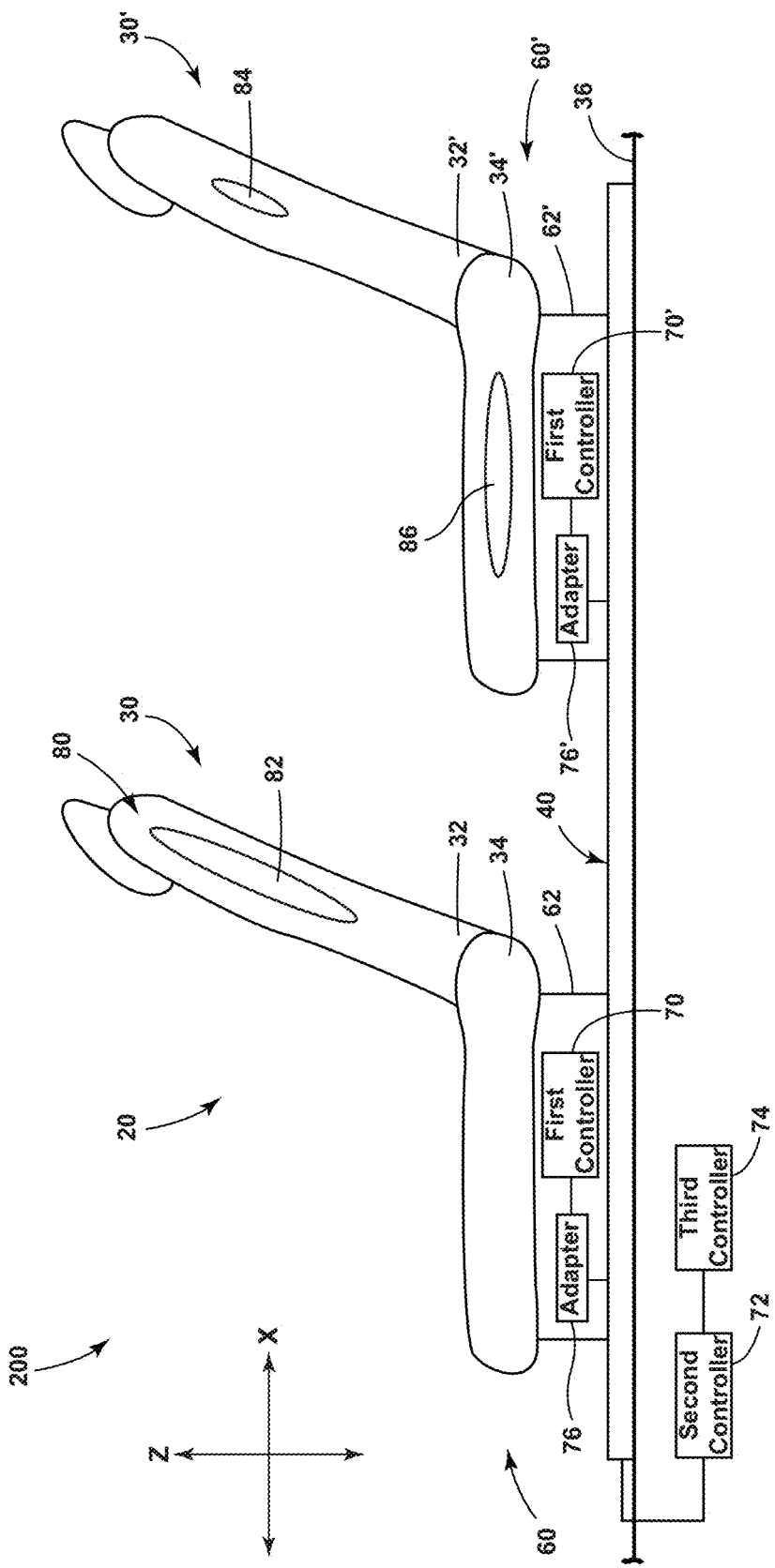
FIG. 10 is a side view generally illustrating an embodiment of an electrical assembly according to teachings of the present disclosure.
Figure 11A:
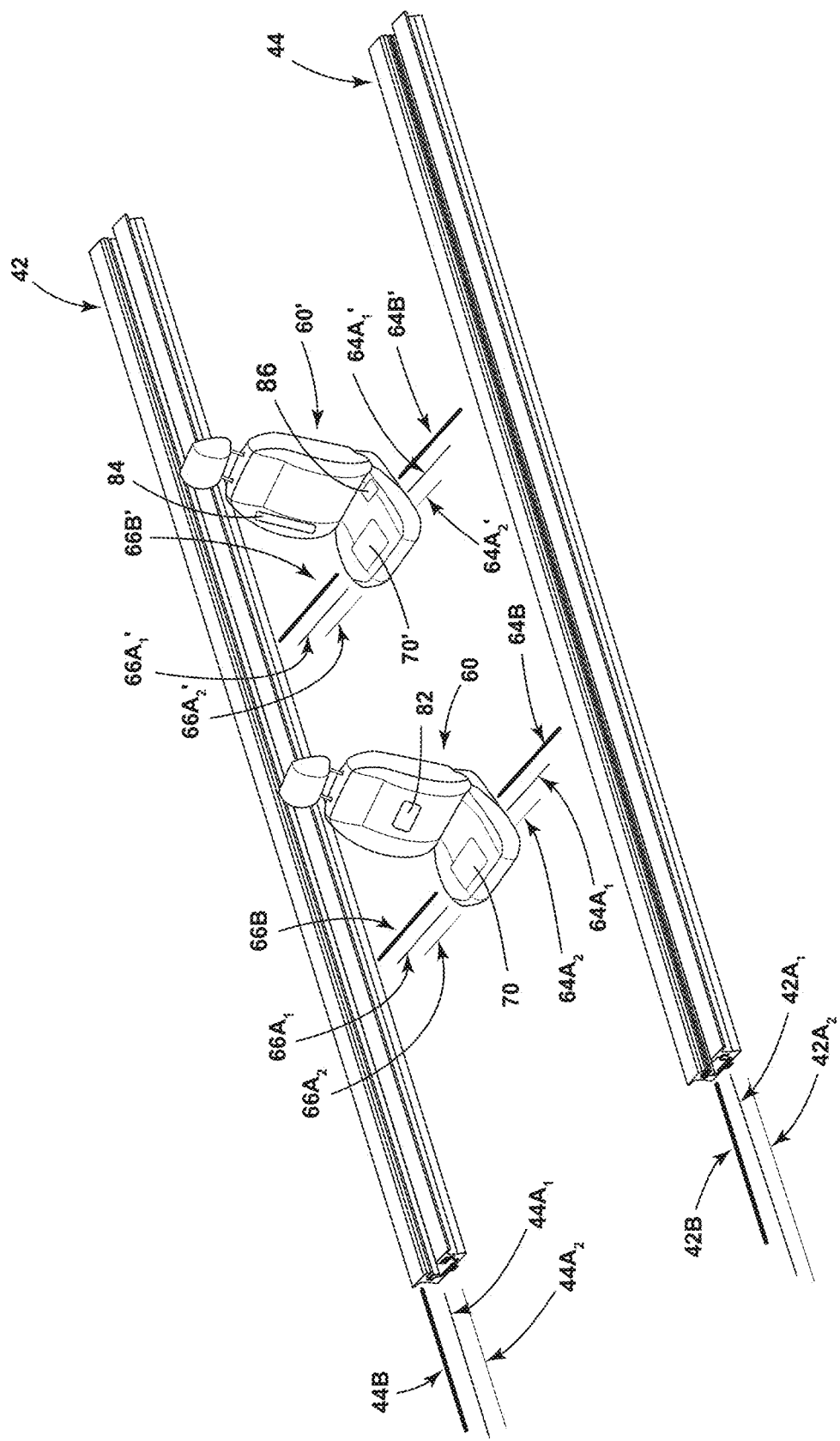
FIGS. 11A and 11B are perspective views of embodiments of electrical assemblies according to teachings of the present disclosure.
Figure 11B:
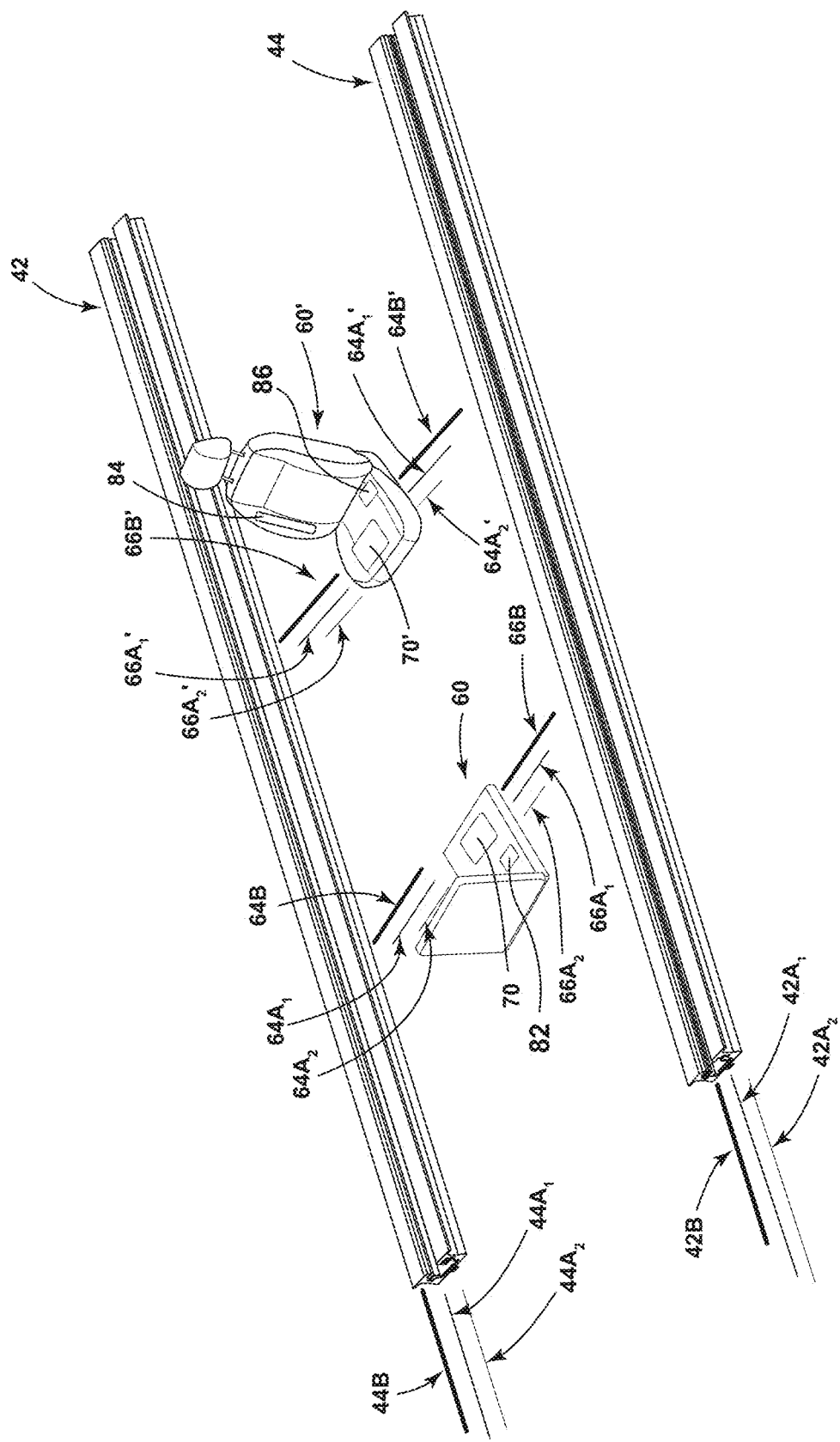

With embodiments, such as generally illustrated in FIGS. 10, 11A, and 11B, an electrical assembly 20 may include a support assembly 60 or a plurality of support assemblies connected to a common track assembly 40 (e.g., support assemblies 60, 60') and/or a plurality of safety devices 80, such as a first safety device 82 that may be connected to support assembly 60 and/or a second safety device 84 and a third safety device 86 that may be connected to a second support assembly 60'. A second support assembly 60' may include a seat 30', a support member 62', contact portions $64A_1'$, $64A_2'$, $66A_1'$, $66A_2'$, contacts 64B', 66B', a first controller 70', and/or an adapter 76' that may be configured in the same or a similar manner as the seat 30, the support member 62, contact portions $64A_1$, $64A_2$, $66A_1$, $66A_2$, contacts 64B, 66B, the first controller 70, and/or the adapter 76, respectively. The seat 30' may include a seat cushion 34' and/or a seat back 32'. As generally illustrated in FIG. 6B, a second support assembly 60' may include a first sensor 100', a second sensor 102', a third sensor 104', a router 132', and/or a first communication device 140', which may be configured in the same or a similar manner as the first sensor 100, the second sensor 102, the third sensor 104, the router 132, and/or the first communication device 140, respectively.

In embodiments, the second controller 72 and/or the third controller 74 may be configured to control the safety devices 82, 84, 86 via the conductor portions $42A_1$, $42A_2$, $44A_1$, $44A_2$. For example and without limitation, the third controller 74 may generate a first trigger signal that may be provided to conductor portion $44A_1$ for activating the first safety device 82, a second trigger signal that may be provided to conductor portion $42A_1$ for activating the second safety device 84, and/or a third trigger signal that may be provided to conductor portion $42A_2$ for activating the third safety device 86. The conductor portions $42A_1$, $42A_2$, $44A_1$, $44A_2$ may be separate from and/or electrically isolated from any power conductors, such as conductors 42B, 44B.

With embodiments, if the first support assembly 60 and the second support assembly 60' are connected in a first orientation, such as generally illustrated in FIG. 11A, the first safety device 82 may be connected to conductor portion $44A_1$ via the contact portion $66A_1$, the second safety device 84 may be connected to the conductor portion $42A_1$ via the contact portion $64A_1$, and/or the third safety device 86 may be connected to the conductor portion $42A_2$ via the contact portion $64A_2$. The safety devices 82, 84, 86 may share a common return conductor, such as the conductor portion $44A_2$. The common return conductor may be separate from and/or electrically isolated from any power conductors, such as the conductor 42B and/or the conductor 44B. The first safety device 82 may be connected to the conductor portion $44A_2$ via the contact portion $66A_2$. The second safety device 84 and/or the third safety device 86 may be connected to the conductor portion $44A_2$ via the contact portion $66A_2'$.

In embodiments, if the first support assembly 60 is connected to the track assembly 40 in a second configuration and the second support assembly 60' is connected in a first orientation, such as generally illustrated in FIG. 11B, the first safety device 82 may be connected to the conductor portion $44A_1$ via the contact portion $64A_1$, the second safety device 84 may be connected to the conductor portion $42A_1$ via the contact portion $64A_1$, and/or the third safety device 86 may be connected to the conductor portion $42A_2$ via the contact portion $64A_2$. The first safety device 82 may be connected to the conductor portion $44A_2$ via the contact portion $64A_2$. The second safety device 84 and/or the third safety device 86 may be connected to the conductor portion $44A_2$ via the contact portion $66A_2'$.

With embodiments, such as generally illustrated in FIGS. 6A, 6B, 11A, and 11B, the safety devices 82, 84, 86 may receive trigger signals and provide return signals independently of any power conductors (e.g., conductors 42B, 44B). In embodiments, such as generally illustrated in FIG. 4, return signals may be transmitted via a power conductor (e.g., conductor 44B), such as along with a power return.

In embodiments, a controller (e.g., the first controller 70, the second controller 72, and/or the third controller 74) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/0) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

With embodiments, an electrical assembly 20 may be connected to and/or included with a vehicle 200, but is not limited to vehicle applications.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, nany modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, comprising:
    a support assembly including:
        a first controller; and
        a plurality of safety devices;
    a track assembly; and
    a second controller;
    wherein the first controller and the second controller are configured to control the plurality of safety devices via a conductor of the track assembly;
    the second controller is configured to combine a plurality of trigger signals into a combined trigger signal; and
    a sequence of the combined trigger signal corresponds to an orientation of the support assembly.

2. The electrical assembly of claim 1, wherein
    the second controller is not disposed in the support assembly;
    the support assembly is configured to move along the track assembly; and
    the support assembly includes an electrical contact configured to contact the conductor.

3. The electrical assembly of claim 1, wherein a first safety device includes an airbag and is configured to be activated by pyrotechnics;
    the plurality of trigger signals includes a first deployment current pulse generated by a third controller; and
    the first safety device is configured to be activated by the first deployment current pulse generated by the third controller and provided from the second controller to the first controller via the conductor.

4. An electrical assembly, comprising:
    a support assembly including a first controller; and
a plurality of safety devices;
a track assembly;
a second controller;
wherein the first controller and the second controller are configured to control the plurality of safety devices via a conductor of the track assembly; and
wherein the support assembly includes a first portion including a first contact; a first track of the track assembly includes the conductor; the first contact is configured to contact the conductor when the support assembly is connected to the track assembly in a first direction; a second track of the track assembly includes an additional conductor; and the first contact is configured to electrically connect with the additional conductor when the support assembly is connected to the track assembly in a second direction.

5. The electrical assembly of claim 1, wherein the first controller includes a first router and the second controller includes a second router.

6. The electrical assembly of claim 5, wherein the first router includes a trigger distributor, and the second router includes a trigger integrator; and
the trigger integrator is configured to combine the plurality of trigger signals into the combined trigger signal.

7. The electrical assembly of claim 5, wherein a third controller is configured to generate a first trigger signal of the plurality of trigger signals for a first safety device of the plurality of safety devices, a second trigger signal of the plurality of trigger signals for a second safety device of the plurality of safety devices, and a third trigger signal of the plurality of trigger signals for a third safety device of the plurality of safety devices;
wherein controlling the plurality of safety devices includes transferring the first trigger signal, the second trigger signal, and the third trigger signal to the first safety device, the second safety device, and the third safety device, respectively; and
wherein the second controller is configured to communicate the sequence to the first controller.

8. The electrical assembly of claim 7, wherein the first trigger signal, the second trigger signal, and the third trigger signal comprise deployment current pulses.

9. The electrical assembly of claim 7, wherein the second router is configured to combine the first trigger signal, the second trigger signal, and the third trigger signal into the combined trigger signal; and
the second router is configured to transmit the combined trigger signal to the first router via the conductor of the track assembly.

10. The electrical assembly of claim 9, wherein the first router is configured to transmit the first trigger signal to the first safety device, the second trigger signal to the second safety device, and the third trigger signal to the third safety device.

11. The electrical assembly of claim 9, wherein the first router is configured to separate the combined trigger signal into the first trigger signal, the second trigger signal, and the third trigger signal.

12. The electrical assembly of claim 11, wherein the first router is configured to separate the combined trigger signal according to information from the second router.

13. The electrical assembly of claim 12, wherein the first controller includes a first wireless communication device; the second controller includes a second wireless communication device; and
the second router is configured to provide the information to the first router wirelessly via the second wireless communication device and the first wireless communication device.

14. The electrical assembly of claim 13, wherein the information includes:
how the first trigger signal, the second trigger signal, and the third trigger signal have been combined into the combined trigger signal; and
how the combined trigger signal can be separated.

15. A vehicle, comprising:
a track assembly;
a support assembly connected to the track assembly, the support assembly including:
a first controller;
a seat;
a plurality of safety devices connected to the seat, the plurality of safety devices including a first safety device, a second safety device, and a third safety device;
a second controller connected to the track assembly; and
a third controller connected to the second controller and configured to generate a first trigger signal for the first safety device, a second trigger signal for the second safety device, and a third trigger signal for the third safety device;
wherein the second controller is configured to combine the first trigger signal, the second trigger signal, and the third trigger signal into a combined trigger signal and transmit the combined trigger signal to the first controller via a single conductor of the track assembly; and
a sequence of the combined trigger signal corresponds to an orientation of the seat.

16. The vehicle of claim 15, wherein the support assembly includes a first router; the second controller includes a second router; and the second router is configured to combine the first trigger signal, the second trigger signal, and the third trigger signal into the combined trigger signal.

17. The vehicle of claim 15, wherein the support assembly includes a first portion including a first contact;
a first track of the track assembly includes the conductor;
the first contact is configured to contact the conductor when the support assembly is connected to the track assembly in a first direction;
a second track of the track assembly includes an additional conductor; and
the first contact is configured to electrically connect with the additional conductor when the support assembly is connected to the track assembly in a second direction.

18. The vehicle of claim 16, wherein the first router is configured to separate the first trigger signal, the second trigger signal, and the third trigger signal from the combined trigger signal received from the second router; and
the first router is configured to provide the first trigger signal to the first safety device, provide the second trigger signal to the second safety device, and provide the third trigger signal to the third safety device.

19. The vehicle of claim 18, wherein the first router is configured to separate the first trigger signal, the second trigger signal, and the third trigger signal according to information from the second controller.

20. The vehicle of claim 15, wherein the support assembly includes a first sensor, a second sensor, and a third sensor;
the second controller includes a first sensor mirror, a second sensor mirror, and a third sensor mirror;

the first sensor is configured to communicate with the first sensor mirror; the second sensor is configured to communicate with the second sensor mirror;

the third sensor is configured to communicate with the third sensor mirror; the first sensor is configured to obtain information about a status of the first safety device;

the second sensor is configured to obtain information about a status of the second safety device; and the third sensor is configured to obtain information about a status of the third safety device.

\* \* \* \* \*